United States Patent
Singh et al.

(10) Patent No.: US 12,179,295 B2
(45) Date of Patent: Dec. 31, 2024

(54) PORTABLE ROBOTIC WELDER FOR NUCLEAR WASTE HANDLING

(71) Applicant: HOLTEC INTERNATIONAL, Camden, NJ (US)

(72) Inventors: Krishna P. Singh, Jupiter, FL (US); Brian Farnsworth, East Liverpool, OH (US)

(73) Assignee: HOLTEC INTERNATIONAL

(*) Notice: Subject to any disclaimer, the term of this patent is extended or adjusted under 35 U.S.C. 154(b) by 990 days.

(21) Appl. No.: 16/995,247

(22) Filed: Aug. 17, 2020

(65) Prior Publication Data
US 2021/0046569 A1 Feb. 18, 2021

Related U.S. Application Data

(60) Provisional application No. 62/887,984, filed on Aug. 16, 2019.

(51) Int. Cl.
*B23K 9/28* (2006.01)
*B23K 9/028* (2006.01)
(Continued)

(52) U.S. Cl.
CPC ............ *B23K 9/0953* (2013.01); *B23K 9/028* (2013.01); *B23K 9/0956* (2013.01); *B23K 9/125* (2013.01);
(Continued)

(58) Field of Classification Search
CPC ........ B23K 9/09; B23K 9/095; B23K 9/0953; B23K 9/0956; B23K 9/10; B23K 9/1087; B23K 9/12; B23K 9/125; B23K 9/1274
See application file for complete search history.

(56) References Cited

U.S. PATENT DOCUMENTS

| | | |
|---|---|---|
| 5,031,816 A | 7/1991 | Kwech |
| 5,249,209 A | 9/1993 | Kwech |

(Continued)

FOREIGN PATENT DOCUMENTS

| | | | | |
|---|---|---|---|---|
| CN | 108247258 A | * | 7/2018 | ......... B23K 37/0252 |
| CN | 207858090 U | * | 9/2018 | ............. B23K 37/00 |

(Continued)

OTHER PUBLICATIONS

PCT Office, International Search Report and Written Opinion issued in correcponding PCT International Application No. PCT/US2020/046671 issued Feb. 5, 2021, pp. 1-13.

(Continued)

*Primary Examiner* — Helena Kosanovic
*Assistant Examiner* — Tiffany T Tran
(74) *Attorney, Agent, or Firm* — The Belles Group, P.C.

(57) ABSTRACT

An automated welding system for sealing high level radioactive waste containers in the field at the nuclear plant site. The system includes a programmable portable robotic welder comprising a multi-jointed articulating robotic arm. A welding head operable to form a weld is mounted to the arm. Operation of the robotic welder and ancillary components is controlled by a programmable controller which implements a welding plan. In one embodiment, a circumferentially-extending lid-to-shell hermetic seal weld may be formed by the robotic welder. The weld is completed in multiple welding passes through the weld joint between the lid and shell guided by an automated joint tracking sensor linked to the controller. The highly portable robotic welder is detachably mountable on the lid to perform the welding. An automated pivotable cable-conduit management apparatus keeps electrically conductive wiring and flow tubing out of the path of the rotating robotic arm during welding.

29 Claims, 26 Drawing Sheets

(51) Int. Cl.
  *B23K 9/095*  (2006.01)
  *B23K 9/12*  (2006.01)
  *B23K 9/127*  (2006.01)
  *B23K 9/16*  (2006.01)
  *B23K 9/32*  (2006.01)
  *G21F 5/12*  (2006.01)

(52) U.S. Cl.
  CPC ............ *B23K 9/1274* (2013.01); *B23K 9/164* (2013.01); *B23K 9/32* (2013.01); *G21F 5/12* (2013.01)

(56) References Cited

U.S. PATENT DOCUMENTS

| | | | |
|---|---|---|---|
| 5,254,835 A | 10/1993 | Dalke et al. | |
| 5,268,941 A | 12/1993 | Kwech | |
| 5,377,235 A | 12/1994 | Kwech | |
| 6,772,932 B1 * | 8/2004 | Halstead | B23K 37/0235 901/42 |
| 6,942,139 B2 | 9/2005 | Lipnevicius | |
| 6,949,005 B1 * | 9/2005 | Larsen | B24B 5/047 451/259 |
| 7,587,942 B2 | 9/2009 | Smith et al. | |
| 8,272,526 B1 * | 9/2012 | Vovan | B65D 43/0254 215/253 |
| 10,008,299 B2 * | 6/2018 | Wellwood | G21F 5/005 |
| 11,282,614 B2 * | 3/2022 | Lloyd | G21F 5/012 |
| 2002/0104833 A1 * | 8/2002 | Bradley | B23K 26/0884 219/121.63 |
| 2004/0138782 A1 * | 7/2004 | Passmore | B23Q 39/044 700/248 |
| 2006/0016856 A1 | 1/2006 | Larsen et al. | |
| 2008/0121041 A1 | 5/2008 | Smith et al. | |
| 2010/0012534 A1 * | 1/2010 | Hoffman | B65D 15/18 206/265 |
| 2016/0012926 A1 * | 1/2016 | Lehnert | G21F 5/012 250/506.1 |
| 2017/0110210 A1 * | 4/2017 | Singh | G21F 5/008 |
| 2017/0189982 A1 * | 7/2017 | Hsu | B23K 9/173 |

FOREIGN PATENT DOCUMENTS

| | | | |
|---|---|---|---|
| CN | 211564802 U | | 9/2020 |
| JP | H07266282 A | * | 10/1995 |
| JP | H0829584 A | * | 2/1996 |
| JP | H08309547 A | * | 11/1996 |
| JP | 2005046881 A | * | 2/2005 |

OTHER PUBLICATIONS

Barker, M. et al., "Welding Robot and Remote Handling System for the Yucca Mountain Waste Package Closure System," Waste Management 2008 Conference Paper, Publication [online] 2008 [retrieved Jan. 12, 2021]. Retrieved from the Internet; pp. 1-8.

* cited by examiner

PORTABLE ROBOTIC WELDER FOR NUCLEAR WASTE HANDLING

CROSS-REFERENCE TO RELATED APPLICATIONS

This application claims the benefit of U.S. Provisional Application No. 62/887,984 filed Aug. 16, 2019, which is incorporated herein by reference in its entirety.

BACKGROUND

The present invention relates generally to canisters used to transport and store high level radioactive waste such as spent nuclear fuel (SNF) created by nuclear generating plants or other facilities, and more particular to a robotic welder for sealing such canisters.

In the operation of nuclear reactors at nuclear plant site, the nuclear energy source is in the form of hollow Zircaloy tubes filled with enriched uranium (aka fuel rods), collectively arranged in assemblages referred to as fuel assemblies. Each fuel assembly contains a multitude of the packaged fuel rods. When the energy in the fuel assembly has been depleted to a certain predetermined level, the fuel assembly is removed from the nuclear reactor. The standard structure used to package used or spent nuclear fuel assemblies discharged from light water reactors for off-site shipment or on-site dry storage is known as the fuel basket. The fuel basket is essentially an assemblage of prismatic storage cells, each of which is sized to store one fuel assembly that comprises a plurality of individual spent nuclear fuel rods. The fuel basket is arranged inside a radiation unshielded metallic storage canister (typically stainless steel). The multi-purpose canister (MPC) available from Holtec International of Camden, New Jersey is one example of such a fuel storage canister. The canister may be placed in turn inside a radiation shielded outer storage or transport overpack or cask for safe transport and storage of the multiple spent fuel assemblies contained within the inner canister's fuel basket.

The spent nuclear fuel ("SNF") in the fuel assemblies within the transport/storage cask is still highly radioactive and produces considerable heat which must be dissipated, in addition to concomitantly emitting dangerous ionizing neutron and gamma photons (i.e. neutron and gamma radiation) requiring protective shielding. Thus, caution must be exercised when the fuel assemblies are handled, transported, packaged and stored. Neutron radiation may be effectively attenuated with outer casks having metallic and polymeric shielding materials typically containing boron. These boron-containing materials however are not effective at attenuating and shielding gamma radiation emitted from the fuel baskets. Effective gamma radiation shielding requires very dense materials, such as lead, steel, concrete, copper, and combinations thereof to also be incorporated into the cask construction. The outer casks which house the spent nuclear fuel canister are thus very heavy and large structures with thick walls, typically weighing about 150 tons and about 15 feet or more high/long, and about 6 feet in internal diameter for housing the unshielded canister.

Transfer of the SNF from wet storage in the water impounded spent fuel pool of the nuclear facility to dry storage involves several operations to change the environment around the fuel from complete immersion in water to an inert gas such as helium. For example, the current practice in the United States is to package the SNF in the stainless-steel canister below water within the spent fuel pool which provides radiation shielding. The unshielded canister is placed inside the outer transfer cask which has been lowered into the fuel pool. The transfer cask along with the canister loaded with fuel assemblies and full of water is lifted out of the pool and set on the area often referred to as the "Decontamination and Assembly Station" (DAS) where the cask is pressure washed to remove surface contaminants. Hermetic seal welding of the closure lid to the top of the canister shell is then carried out. This process is typically completely by manually welding the lid to the canister, which exposes the workers to a dosage of radiation.

Attaching the lid to the canister via a lid-weld is a classic case of manual welding in a high radiation field. The lid-to-shell weld, by necessity, is made on the storage vessel with high level nuclear waste (nuclear fuel) inside. By necessity, this creates the radiological confinement in an all-welded container. There is a constant stream of various gamma, neutron and other radiation energies at the lid weld. With current fabrication practices, there is much human operator interaction with the component at this location of lid closure. During welding, this interaction is for extended periods of time. Presently, the closure lid to the shell weld is a circumferential deep groove-type weld joint weld that is completed using a multi-pass welding process by a qualified welder. The USNRC (United States Nuclear Regulatory Commission) typically requires the weld deposits to be progressively examined by the liquid penetrant process, which ensures the deposited weld is sound and does not have any structurally deleterious defects. Quality of the weld is therefore of paramount importance to the long-term function of the vessel and public safety. Completion of the lid-to-shell weld by manual means, however, is unfortunately a high dose accretive operation.

Improvements in making the nuclear waste canister lid-to-shell closure weld in the field at the nuclear plant site is desired which can decrease radiation exposure of the human weld operators without sacrificing weld quality.

BRIEF SUMMARY

The present application discloses an automated welding system and process which utilizes a portable robotic welder (PRW) under control of a microcontroller to make the foregoing nuclear waste canister lid-to-shell closure weld in the filed at the nuclear plant site. The welding process may be monitored by a remote human operator who can operably interact with the welding control system formed by the microcontroller and various type sensors operably coupled thereto which can obtain and provide real-time actual data for use in controlling the PRW. Using the PRW, higher weld deposition rates than manual welding can be achieved. Advantageously, the PRW eliminates directly exposing human welders to the radiation emitted by the nuclear waste canister for an extended period of time which occurs in conventional manual welding operations to hermetically seal the lid to the canister.

It is considered especially desirable and valuable in such welding operations that must occur in high radiation environments to minimize radiation exposure to humans. In the nuclear industry, ALARA is an acronym used in radiation safety for "As Low as Reasonably Achievable." The ALARA radiation safety principle is based on the minimization of radiation doses and limiting the release of radioactive materials into the environment by employing all "reasonable methods." ALARA is not only a sound radiation safety principle, but it is a regulatory requirement for all "radiation protection programs." The ALARA concept is an integral part of all activities that involve the use of radiation or radioactive materials and can help prevent unnecessary human exposure as well as overexposure to working environment radiation. The three major principles to assist with maintaining doses "As Low as Reasonably Achievable" are time, distance and shielding. More than merely best practice, ALARA is predicated on legal dose limits for regulatory compliance and is a requirement for all radiation safety programs. The basis for ALARA is a radiation safety philosophy based on the conservative assumption that radiation dose and its biological effects on living tissues are modeled by a relationship known as the linear hypothesis. Simply put, every radiation dose of any magnitude can produce some level of potential detrimental health effects.

The present portable robotic welder (PRW) and associated automated welding system and process disclosed herein for making the canister lid-to-shell seal weld significantly contributes to meeting ALARA objectives.

Although the PRW and associated automated welding system and process is described herein for convenience without limitation with respect to forming the circumferential lid-to-shell seal weld for a nuclear waste canister (which is a term of art), its application is not limited to canisters alone. The PRW and associated system and process may be used for forming the circumferential lid-to-shell seal weld in numerous other types of cylindrical containers holding radioactive nuclear waste which may be used in the nuclear industry. Some examples without limitation include radiation shielded overpacks or casks such as a Holtec International (Camden, NJ) Vertically Ventilated Overpack (VVO) for above-ground storage, underground Vertical Ventilated Module (VVM), and HI-TRAC transfer casks; each of which holds the canister (which may be a Holtec MPC) which in turn contains the high level nuclear waste material. Such casks may be configured to hold more than a single canister. Accordingly, the term "container" may optionally be used and should be broadly interpreted and understood to include any of the foregoing types of nuclear waste storage vessels, and others not specifically enumerated herein.

In addition, the PRW and associated automated welding system and process may further be used to make circumferential welds other than the lid-to-shell seal welds which may be encountered with any of the foregoing nuclear waste storage containers. This may include the welds used to attach annular cover plates which may welded to the lid to cover the lid-to-shell seal welds for added protection. In yet other embodiments, the PRW and associated automated welding system and process may be used for making non-circumferential welds which may be encountered on the top of the nuclear waste container. In essence, any type welds formed on top of the container which might be performed and reached by the robotic welder centrally positioned on the lid of the container are amenable to welding according to the present disclosure.

According to one aspect, a robotic welding system for containment of radioactive nuclear waste comprises: a container defining a cavity configured to hold the nuclear waste; a lid disposed on the container and defining an open weld joint therebetween; and a programmable robotic welder positioned over the lid, the robotic welder programmable and operable to automatically form a weld in the weld joint.

According to another aspect, a robotic welding system for containment of radioactive nuclear waste comprises: a container defining a cavity configured to hold the nuclear waste; a lid disposed on the container and defining an open circumferential weld joint therebetween; a robotic welder comprising an articulating arm assembly rotatably supported by a base detachably mounted on the lid, articulating arm assembly movable in circumferential and radial directions relative to the lid; the robotic welder further comprising a welding head disposed at a distal end of the articulating arm assembly and operable to form a hermetic seal weld in the circumferential weld joint; and a programmable main controller operably coupled to the articulating arm assembly, the main controller programmable configured to control movement and operation the articulating arm assembly and welding head to form the hermetic seal weld in accordance with a preprogrammed welding plan.

According to another aspect, a method for hermetically sealing nuclear waste in a container comprises: (a) providing a robotic welder comprising an articulating arm assembly rotatably mounted on a base, and a welding head mounted on a distal end of the articulating arm assembly and operable to form a hermetic seal weld; (b) communicably linking a programmable main controller to the robotic welder, the main controller configured to control operation and movement of the robotic welder; (c) positioning a lid on top of the container to define a circumferential weld joint between the lid and the container; (d) detachably mounting the base of the robotic welder on the lid; and (e) automatically forming a hermetic seal weld in the weld joint via the robotic welder under control of the main controller. In certain embodiments, step (e) comprises steps of: (e1) positioning the welding head at a first starting point at the circumferential weld joint; (e2) rotating the welding head a first full revolution from the first starting point back thereto while depositing weld material to form a first contiguous weld bead in the weld joint, the welding head completing a first welding pass; (e3) positioning the welding head at a second starting point at the circumferential weld joint; and (e4) rotating the welding head a second full revolution from the second starting point back thereto while depositing weld material to form a second contiguous weld bead in the weld joint, the welding head completing a second welding pass.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein like elements are labeled similarly and in which.

Figures 1, 2A, 2B:
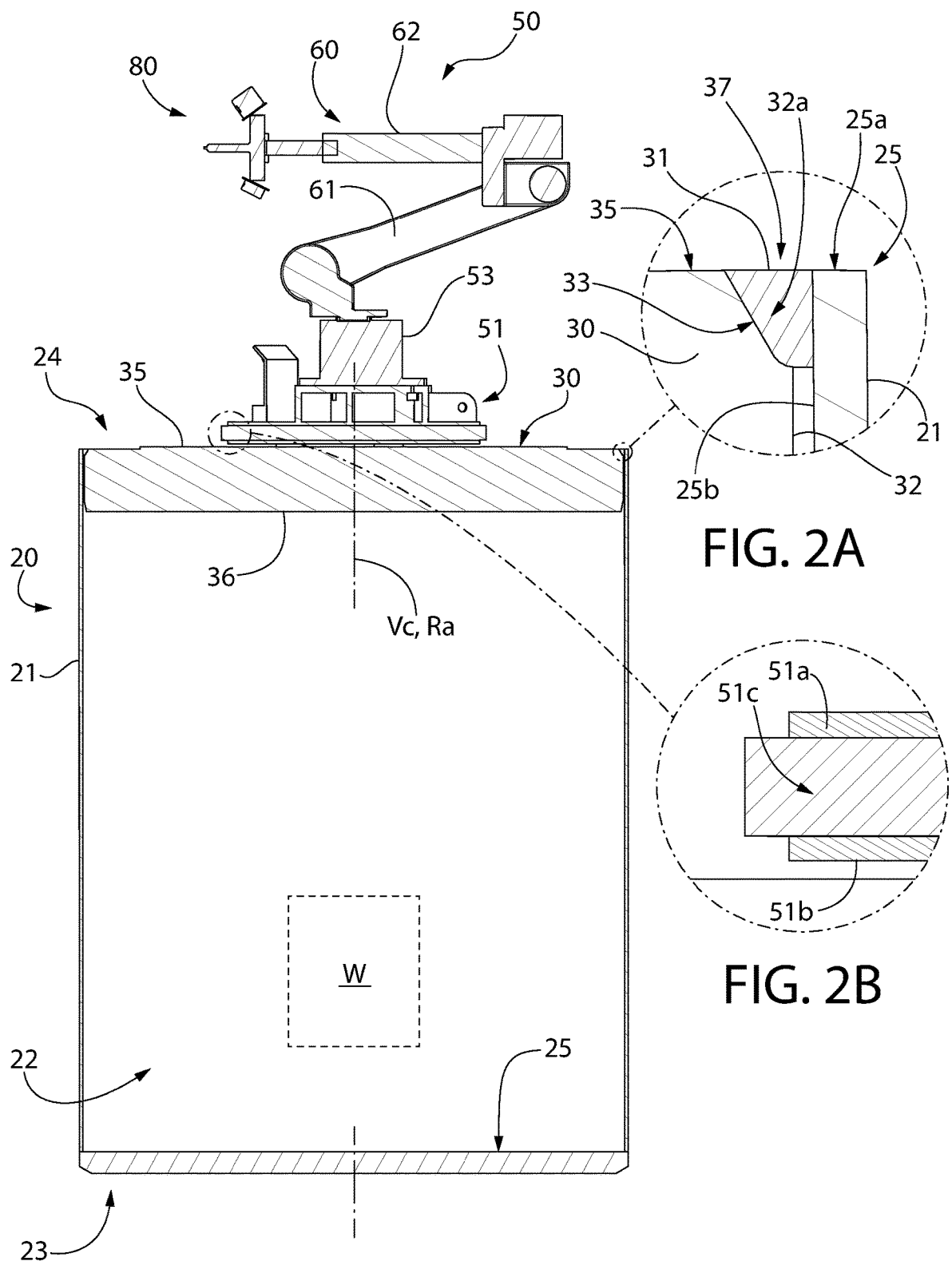
FIG. 1 is a side cross-sectional view of a nuclear waste container with automated portable robotic welder perched on top, according to one embodiment of the present disclosure.
FIG. 2A is a detailed view therefrom of the container lid-to-shell circumferential weld.
FIG. 2B is a detailed view therefrom showing the composite construction of the lid.
Figure 3:
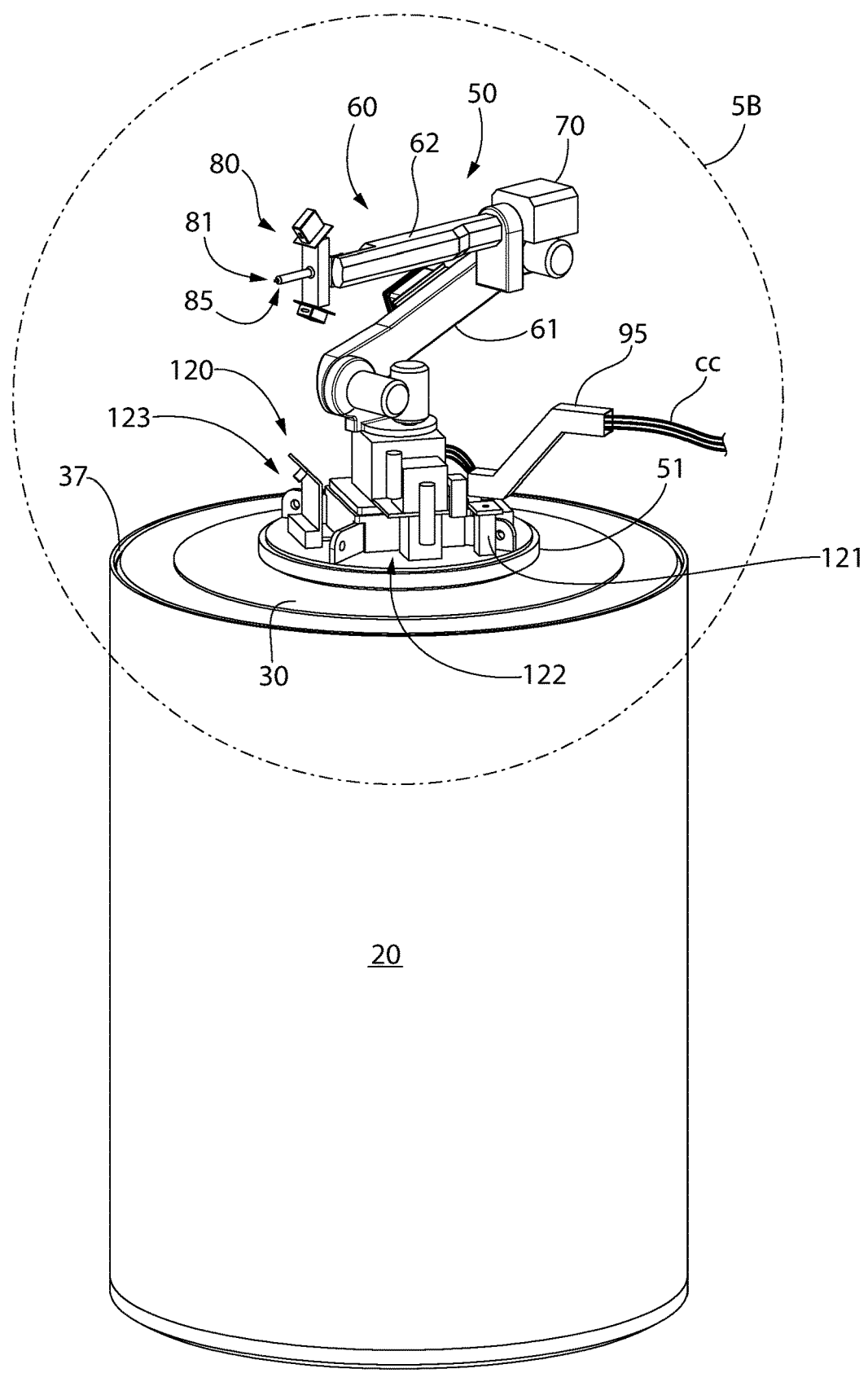
FIG. 3 is a first perspective view of the container and robotic welder of FIG. 1.
Figure 4:
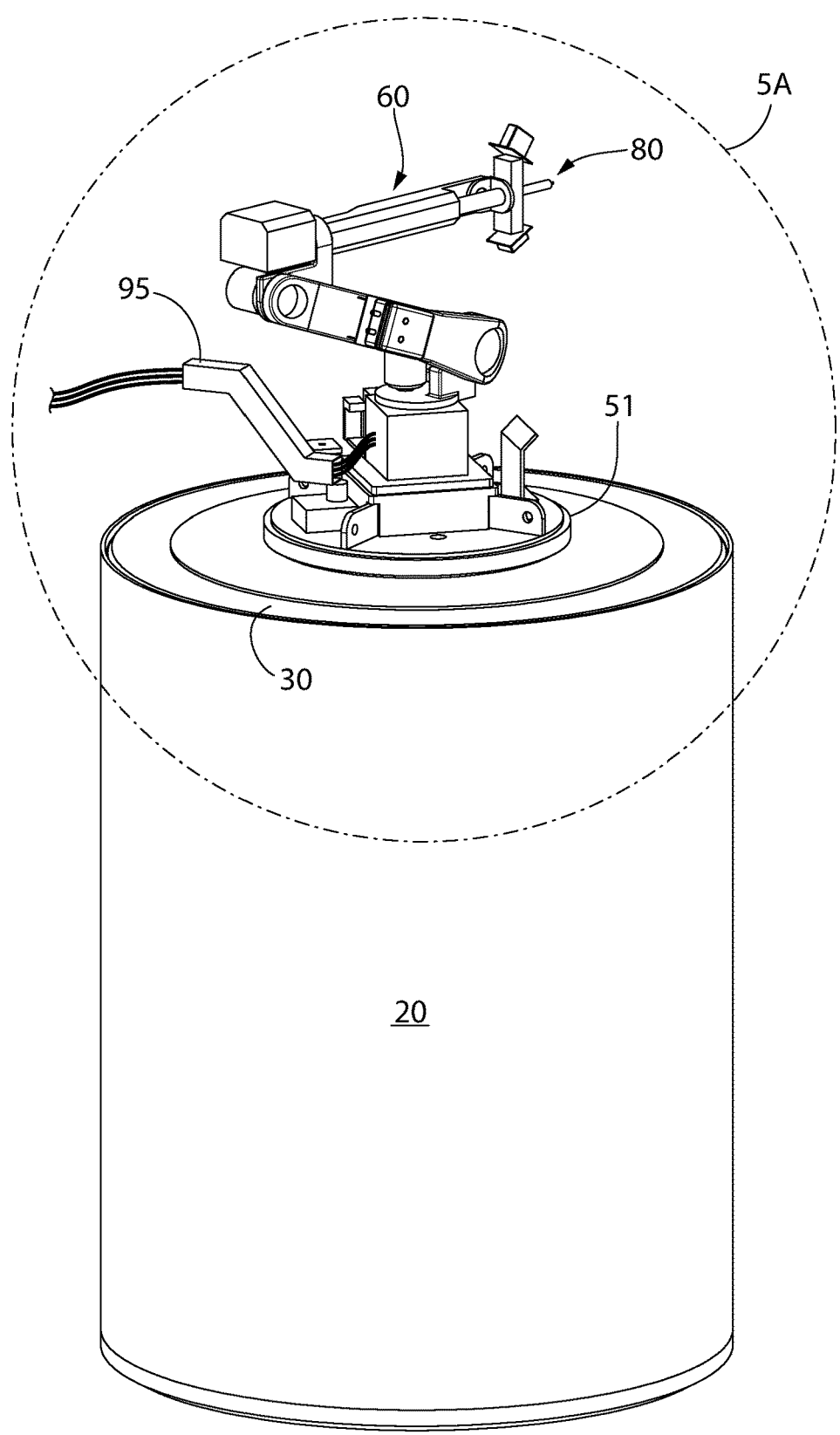
FIG. 4 is a second perspective view of the container and robotic welder of FIG. 1.

All drawings are schematic and not necessarily to scale. Features shown numbered in certain figures are the same features as they may appear un-numbered in other figures unless noted otherwise herein. A reference to a figure by whole number which comprises multiple figures with the same whole number but different alphabetical suffixes should be construed as a reference to all those figures unless noted otherwise herein.

DETAILED DESCRIPTION

The features and benefits of the invention are illustrated and described herein by reference to exemplary (i.e. "example") embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

The novel automated robotic welding process and associated portable robotic welder (PRW) disclosed herein can effectively and safely distance personnel from the radiation hazards they would otherwise encounter while manually making the nuclear waste canister lid-to-shell weld. This advantageously brings factory automation technology into a field weld setting thereby replacing manual welding in an area of high radiation system. The welding process is implemented by the processor-based programmable main controller 100 which controls operation of the PRW via a sensor array. The automated welding system defined by the PRW and controller is designed in a way to process and execute program instructions such as control logic (software) via an efficient and expedient highly automated digital control.

FIGS. 1 and 2 show a nuclear waste container in the non-limiting form of a canister 20 having a closure lid 30 which may be seal welded thereto by the portable robotic welder (PRW) 50 and the automated robotic welding process disclosed herein. Canister 20 may be a multi-purpose canister (MPC) available from Holtec International of Camden, New Jersey in one embodiment, however; other type canisters may be used with the present robotic welding system.

Canister 20 may have an elongated tubular body defining a longitudinal centerline axis LA. The canister body includes a top end 24, bottom end 23, and a cylindrical shell 21 extending longitudinal therebetween. The canister defines an internal cavity 22 extending for the full height of the canister which is configured to hold high level radioactive nuclear waste W in any form or shape, such as spent nuclear fuel (SNF) rods held in a fuel basket or other type support cell arrays, or other miscellaneous high level radioactive waste materials of any form. Such radioactive waste, represented schematically in FIG. 1, may be created by a nuclear power generation facility or other facility employing a nuclear reactor. Bottom end 23 of canister 20 is closed by a circular baseplate 25 hermetically seal welded to bottom end of shell 21. Baseplate 25 supports the nuclear waste W. An annular top peripheral edge portion 25 extends perimetrically and circumferentially around the top end of the shell 21. Peripheral edge portion 25 may be rectilinear in configuration as shown, thereby defining a generally squared-off edge profile.

Closure lid 30 is hermetically seal welded to top peripheral edge portion 25 of shell 21 to form a fluid-tight (i.e. air, liquid, and gas) enclosure of the nuclear waste W. Lid 30 has a circular solid body including a top surface 35, opposite bottom 36, and a circumferentially-extending cylindrical side 32 defining an annular peripheral surface or edge 32a of the lid which faces radially outwards. Top and bottom surfaces 35, 36 are major surfaces which extend for the full diameter of lid 30 from edge to opposite edge. In one embodiment, the top surface 35 may be flat/planar and parallel to the bottom surface 36 which may be flat in one embodiment as shown; however, the bottom surface may have other non-planar profiles and thus at least portions may be non-parallel to the top surface in other constructions.

In one embodiment, lid 30 has a smaller outside diameter than the inside diameter of the shell 21 such that the lid may fit completely inside cavity 22 of canister 20. The top surface 35 of the lid may sit substantially flush with the top surface 25a of the top peripheral edge portion 25 of the shell when the lid is fully mounted to the canister 20, in some embodiments as shown. The term "substantially" as used here connotes slight deviations from a perfectly flush mounting attributable to manufacturing and shop fabrication tolerances, and variations in fit-up and seal welding the lid to the canister.

A circumferentially-extending circumferential weld joint 37 filled by a hermetic seal weld 31 may be formed and laid by PRW 50 between the uppermost or top portion of the side 32 of lid 30 at its peripheral edge 32a, and the inside surface 25b of the top peripheral edge portion 25 of shell 21 inside canister cavity 22. An annular angled chamfered surface 33 may be formed which extends between the top surface 35 and side 32 of lid 30 to define an upwardly open single bevel type circumferential butt joint in one embodiment, which is filled by the hermetic seal weld 31 having a complementary configured shape. The seal weld 31 preferably may be a butt weld for superior strength and deep penetration to create a good hermetic seal. Other types/shapes of butt joints and concomitantly butt welds may be used, such as for example without limitation a square butt joint/weld, single V butt joint/weld, single or double J butt joint weld, etc. Chamfered surface 33 extends circumferentially around the entire perimeter and peripheral edge of and at the top of the lid 30 and aids to support the innermost side of weld 31. Any suitable angle to the horizontal plane defined by the top surface 35 of lid 30 may be used. In some embodiments, as shown, the finished seal weld 31 may be ground substantially flush after welding to the top surface 35 of lid 30 and top surface 25a of peripheral edge portion 25 as shown.

Both the lid 30 and foregoing parts of the canister 20 may be formed of a suitable metal, preferably corrosion resistant, such as stainless steel. Other suitable metallic materials for this application may be used; however, the same material preferably should be used for the lid and canister when possible to avoid the necessity for forming dissimilar metal seal welds. The lid 30 may have any suitable thickness (measured between top and bottom surfaces 35, 36) to provide effective radiation shielding and minimize exposure of personnel to radiation dosage encountered by any limited duration tasks that might be performed to setup the robotic welding process for seal welding the canister lid. Lid 30 may be thicker than the baseplate 25 by comparison.

FIGS. 1-16 show the portable robotic welder (PRW) 50 of the automated robotic welding system detachably mounted and positioned on the closure lid 30 of nuclear waste canister 20 in preparation for forming the circumferential canister lid-to-shell hermetic seal weld 51. In one embodiment, the rotatable and multi-directional articulating PRW 50 may be centrally positioned and mounted on the lid 30 with respect to its geometric center, which is coincides with the vertical centerline Vc of canister 20. The centrally-located PRW 50 includes a radiation-shielded base 51 mounted directly on the top surface 35 of lid 30 such as via a bolting 52 at plural locations spaced about the base to form a rigid and stationary, but readily detachable mount to the lid 30. This stabilizes the base to lid interface of the PRW. Base 51 may be a disk-shaped and circular thick metal plate (e.g. carbon or stainless steel) as shown in the illustrated embodiment; however, other non-polygonal and polygonal shapes may be used. A plurality of lifting lugs 54 welded to or integrally formed with the base 51 as a unitary structural part thereof may be provided which are configured for connection rigging (e.g. rigging holes) to allow a crane or other lifting motorized device to maneuver and position the PRW 50 atop the lid 30.

In one embodiment, the base 51 may be configured and constructed to shield and protect the PRW 50 and its associated ancillary components described herein from the gamma and neutron radiation emitted by the nuclear waste W contained inside canister 20. Accordingly, base 51 may comprise a boron-containing material. In one construction, base 51 may have a sandwiched composite construction comprising a top metal layer 51a, a bottom metal layer 51b, and a neutron-absorbing intermediate layer 51c formed of the boron-containing material effective to deflect and attenuate the neutron radiation. In one non-limiting preferred embodiment, the intermediate layer 51c may be formed of Holtite™ (a proprietary product of Holtec International of Camden, NJ), which generally comprises hydrogen rich polymer impregnated with boron carbide particles. Other boron containing materials however may be used and the invention is not limited to use of the foregoing proprietary product. The intermediate layer 51c thus protects the PRW 50 from direct neutron streaming, and in some embodiments may have a greater thickness than the to or bottom metal layers 51a, 51b.

Top and bottom metal layers 51a, 51b of composite PRW base 51 may be formed of a dense metallic material like steel (e.g. carbon or stainless steel) effective to block gamma radiation emitted by the nuclear waste W and to protect the intermediate layer 51c from physical damage when maneuvering lid 30 into position on canister lid 30. In other embodiments, however, the PRW base 51 may be formed of entirely steel, or have a composite construction including additional or different materials such as lead or copper for gamma blocking, or other boron-containing materials for neutron attenuation. Accordingly, numerous approaches may be used in the construction a radiation shielded base 51.

With general reference to FIGS. 1-24, PRW 50 further includes robotic arm comprising a multi-jointed articulating arm assembly 60. Arm assembly 60 may be rotatably coupled to an electrically-motorized and geared rotary drive unit or mechanism 53. Drive mechanism 53 may be a commercially-available product which may be provided with the robotic arm and generally includes a gear box 53a comprising a gear or gear train inside movably coupled to an electric servo drive motor 66. Servo drive motors include an encoder which provides closed-loop control which incorporates positional feedback information to the present welding process main controller 100. This allows the main controller to know the position and orientation of the articulating arm 60 segments at all times, thereby allowing the controller to control and control the movement of the various segments as necessary to achieve the desired motion and positioning of the robotic arm. Such servo drives and their closed loop feedback control are well known in the art without further elaboration necessary.

The robotic arm rotary drive mechanism 53 may be mounted directly to the radiation shielded base 51 plate or optionally to a raised support platform 55 extending upwards from the generally flat base plate in one embodiment as shown to elevate the drive mechanism and articulating arm assembly 60. Rotary drive mechanism 53 is operable to rotate the arm assembly in a full 360 degree circumferential path around the lid 30 via a horizontally-oriented rotary joint 56. The rotary mechanism rotates articulating arm assembly 60 in a horizontal plane up to 360 degrees in either rotational direction about a vertical rotational axis Ra defined by the geometric center of the base 51 which may be aligned with the vertical centerline Vc of canister 20. The rotary mechanism gear box 53*a* and base 51 thus movably supports the entire weight of PRW 50 in a stable manner to allow a precision hermetic seal weld 31 to be deposited in circumference weld joint 37.

The robotic articulating arm assembly 60 includes a plurality of movable jointed arms rotatably coupled together by multiple rotary joints to provide a robotic welder with six axis/six degrees of freedom of movement of the arm assembly in a three dimensional space. The arm assembly 60 generally includes a proximal arm 61 closest to the base 51 and coupled to rotary mechanism 53 and a distal arm 62 farthest from the base (when arm 42 is fully extended outward and straightened). The terms proximate/proximal and distal, and variants thereof, refer to relationships with respect to the base 51 for convenience of reference. In one embodiment, a commercially-available FANUC ARC Mate 120iC from Fanuc Corporation, Japan may be used. Other model or types of robotic arm assemblies from other manufacturers however may be used and does not limit the invention to a particular brand or model. The PRW may include all the usual accessories and appurtenances known in the art necessary to provide a fully functional and programmable robotic welder.

The proximate end of proximal arm 61 may be coupled to rotatable platter 56 of the rotary mechanism 53 which can rotate a full 360 degrees in either direction at the horizontally-oriented rotary joint 64. A structural coupling bracket 67 rigidly mounted to platter 56 may couple a vertically-oriented first main rotatory joint 63*a* of proximal arm 61 to the platter. Proximal arm 61 is vertically rotatable in a vertical plane with respect to the PRW base 51 and lid 30.

The proximate end of distal arm 62 may be rotatably coupled in turn to the distal end of proximal arm 61 by a vertically-oriented second main rotary joint 63*b* arranged between the arms. Distal arm 62 is vertically rotatable in a vertical plane with respect to the proximal arm 62 of the articulating arm assembly 60 and base 51/lid 30. A third rotary joint 65 allows the distal arm 62 to rotate a full 360 degrees in either direction coaxial with respect to the longitudinal centerline axis Lc of the distal arm. Other arrangements of platters and rotary joints may be used.

Welding head 80 is mounted to the distal end of distal arm 62 via an enlarged mounting bracket 82. Welding head 80 is essentially an elongated nozzle including central passage 80*a* for feeding out welding wire 81 from the tip 85 of the nozzle, and an annular shielding gas outlet passage 80*b* surrounding the wire for forming the gas shield when welding (see, e.g. FIGS. 19A-C). The gas shield or envelope prevents outside elements or contaminates in the welding environment from creating impurities in the formed weld which can comprise its structural integrity.

The welding wire 81, which protrudes outwards from welding head 80 by a preselected distance, provides the filler metal for forming the weld beads in the weld joint and is considered a consumable. A continuous supply of welding wire 81 is fed to the welding head 81 during the welding process from a bulk wire supply spool or barrel. The welding wire also acts as the electrode for the welding process.

Welding head 80 can be rotationally articulated via servo drive mechanism 68 mounted to the proximal end of distal arm 62. Distal arm 62 is rotatable coaxially about its longitudinal centerline Lc in either direction a full 360 degrees via the drive mechanism 68. This allows the welding head to be concomitantly rotated a full 360 degrees as desired. An articulated joint or wrist bracket 69 affixed to head mounting bracket 82 further allows the welding head to be pivotably and angularly adjusted via drive mechanism 68 with respect to distal arm 62. This allows the head to pivoted or tilted as need to the proper orientation for making the circumferential hermetic seal weld 31 in weld joint 37.

The robotic welder 50 further includes an automatic welding wire feeder 70 which may be mounted articulating arm assembly 60. Wire feeder 70 is coaxially aligned with distal arm 62 to feed welding wire 81 along longitudinal centerline axis Lc of distal arm 62 to the welding nozzle or head 80 (also coaxial with axis Lc). Wire feeder 70 may be fixedly mounted to the proximal end of distal arm 62 as shown (see, e.g. FIGS. 5A-B). (e.g. at servo drive mechanism 68 in one embodiment). The wire feeder is operable to continuously feed welding wire 81 to a welding head 80 as the wire is consumed during the welding process. Complete automatic wire feeders for mounting on articulating arm assembly 60 are commercially available from numerous companies, such as for example Lincoln Electric of Cleveland Ohio (Autodrive® models) or other feeder manufacturers.

In addition to feeding welding wire, the commercially-available wire feeder 70 is further fully equipped to supply cooling water and electric power to the water-cooled welding head 80 via a plurality of input connections on the rear of the unit's housing. These connections may include, for example without limitation, a welding wire conduit connection 72*a* for routing wire from an wire external spool or barrel into the unit, an electric power connection 72*b* for powering the feeder and welding head 80, a shielding gas fluid connection 72*d* for fluid coupling to a gas hose from a source of weld shielding gas, and a pair of cooling fluid connections including cooling water inlet and outlet fluid connections 72*c* for fluid coupling to an external cooling water source such as a cooling water heat exchanger 73 thereby forming a closed cooling loop with the feeder unit. The cooling water lines, electric power line, and welding wire 81 from the wire feeder 70 may be routed to the welding head 80 via an outer cable conduit 74 mounted to the distal arm 62 of articulating arm assembly 60 (see, e.g. FIG. 5A).

Figure 5A:
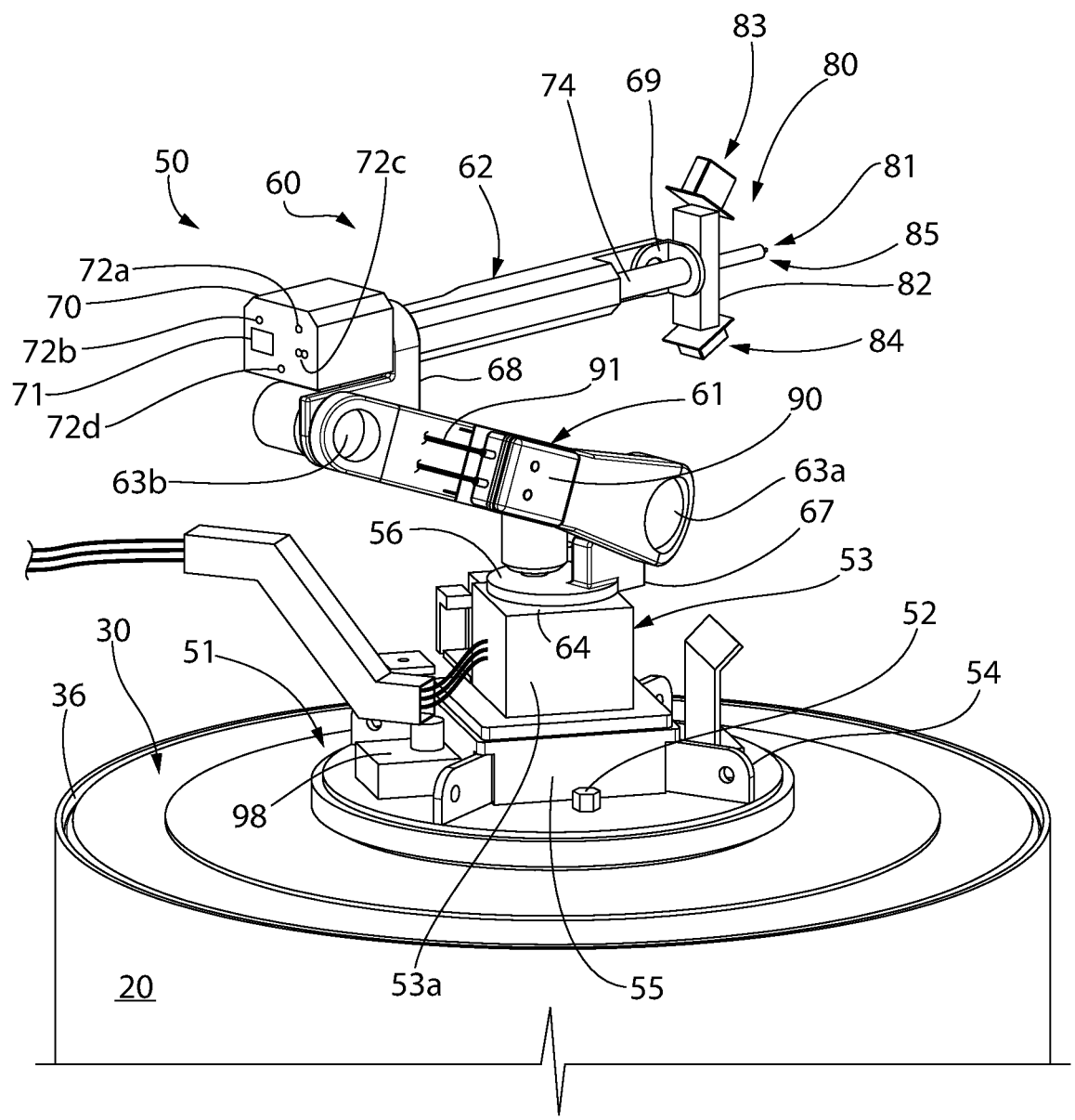
FIG. 5A is a detailed view taken from FIG. 4.

The automatic wire feeder 70 further standardly includes a programmable sub-controller 71 represented schematically in FIG. 5A by the box shown on the rear of the feeder unit. Sub-controller 71 includes software and/or firmware which digitally controls the wire feed rate necessary to maintain a preselected protrusion length of weld wire 81 from the weld nozzle or head 80 to produce a quality weld. The sub-controller also includes an associated communication interface for wired or wireless linkage via communication links 101 to the welding system main controller 100 (see, e.g. welding system schematic control diagram FIG. 26). This establishes two-way communications and coordinated control between the main controller and sub-controller of the feeder unit. Via one or more temperature sensors 86 mounted to the welding head 80, the sub-controller 71 may further be programmed to automatically control the cooling water flow to the weld head and electric power supply thereto provided through the wire feeder 70.

In some embodiments, welding head 80 further includes a weld seam or joint vision tracking system which includes a touchless joint tracking sensor 83 and a high-resolution digital weld monitoring camera 84. These devices may both be mounted to the welding head 80 via bracket 82. Both the touchless joint tracking sensor and camera are operably coupled to and controlled at least in part by main controller 100 via communication links 101. The camera 84 provides real-time images during the welding process to the controller 100, which in turn displays the images on a visual display 102 operably linked to the controller. Camera 84 is configured and constructed especially for use in harsh welding environments to monitor arc welding processes. The camera unit may include lighting (e.g. LED's) for illuminating the weld joint 37 as the welding head 80 circumnavigates the canister 20, and integrated air cooling provisions for fluid connection to the cooling air pressure reduction unit 90. The camera 84 may also include an auto-iris feature that automatically dims during welding based on a light sensor, so the welding operations can be remotely and safely monitored by an operator without human presence necessary in the immediate area of welding at the nuclear waste container 20. This advantageously eliminates exposure to both radiation emitted from the canister 20 and welding arc flash. Suitable complete weld monitoring cameras packages which may include camera control image display software that be used include Models XVC-1000e/XVC-1100e available from Xiris Automation Inc. of Ontario, Canada and other suppliers.

The touchless joint tracking sensor 83 optically locates the weld seam or joint 37 in real-time and measures the geometry and contours of the joint. In certain embodiments, the joint tracking sensor may be a laser sensor. Suitable laser joint tracking sensor devices and associated tracking systems (i.e. software) are available from Servo-Robot Inc. of Quebec, Canada (e.g. Auto-Trac/LW™) and other suppliers. The joint tracking sensor unit may include integrated air cooling provisions for fluid connection to the cooling air pressure reduction unit 90 describe herein. The touchless joint tracking sensor system allows the main controller 100 to develop a welding plan based on the actual measured geometry of the weld joint (e.g. dimensions and contours) via a communication link with the joint tracking sensor unit's sub-controller which locally controls operation of the sensor. The welding plan essentially includes the welding sequence in which the hermetic seal weld 31 will be completed in multiple passes around the joint to an amount deposit weld material (i.e. weld bead) with each pass, and the precise welding path followed by the articulating arm assembly 60 and particularly the welding head 80 itself.

Obtaining and using the geometric information about the actual weld joint measured via the touchless joint tracking sensor 83 and process by the main controller 100 may be approached in two ways. In a first "advanced mapping" approach, the PRW 50 rotates the articulating arm assembly 60 such that the touchless joint tracking sensor 83 circumnavigates the circumferential weld joint 37 one complete time or pass (without performing any welding). The sensor 83 scans and maps the geometric profile of entire weld joint as it travels along the joint, and then transmits the weld joint mapping information back to the main controller 100. The main controller is programmed (via software/control instructions) to develop and then implement the welding plan based on the joint mapping information. The welding plan when executed by controller 100 instructs the PRW 50 how many welding passes are to be made around the weld joint 37, and the size/dimensions and placement of the continuously formed weld beads associated with each pass until the weld joint is progressively filled by the weld material deposited by the welding wire 81 in each pass to complete the weld. The welding plan is also relayed and coordinated with the sub-controller 71 associated with the welding wire feeder 70 which adjusts the wire feed rate to match the welding plan rate of weld material deposition required.

In a second "real-time mapping" approach, the weld joint 37 is mapped in real-time simultaneously with depositing weld material and forming hermetic seal weld 31 in order to develop a welding plan "on-the-fly." The touchless joint tracking sensor 83 maps the weld joint as described above by looking ahead of the welding tip of the weld head 80 as the weld is forming, and transmitting the mapping information back to the main controller 100. The welding process and multiple-passes of the welding head along the joint progresses to eventually form the completed weld, as previously described above in the first approach.

In conjunction with implementing the second real-time mapping approach, the main controller 100 and/or sub-controller of the joint tracking sensor 83 executes a preprogrammed adaptive control software provided with the vision system. This adaptive control software/program allows the controller 100 to monitor the geometry of the weld joint in real-time and seamlessly adapts the deposited weld material placement and dimensions with each pass to uniformly and progressively fill the joint with the weld 31 regardless of variations encountered in the joint's topography with no or negligible remote human interaction with the controller.

The PRW 50 further includes an air cooling system for cooling and protecting the touchless joint tracking sensor 83 and camera 84 from the heat generated at the welding head 80 during the welding process. In one embodiment, the air cooling system generally comprises an air pressure reduction unit 90 which includes an air flow manifold and air pressure regulating valve. The unit 90 is fluidly coupled to an available supply of compressed cooling air at the nuclear site/facility. The house air line pressure is reduced by the pressure reduction unit to a preselected maximum air pressure setpoint associated with the pressure regulating valve. Operation of the unit 90 and air pressure setpoint may be controlled by microcontroller 100. In instances where a source of nuclear plant air is not readily available, a portable air compressor may be used as the source of cooling air. The cooling air is dispensed to the joint tracking sensor 83 and camera 84 via air conduits or tubing 91 which may be routed along the articulating arm assembly 60. Suitable air pressure reduction units 90 are commercially-available from sources such as Servo-Robot Inc. or others.

According to another aspect of the present disclosure, a cable organizer or management apparatus is provided. Since the PRW 50 must complete a full 360 degree circumferential canister lid-to-shell weld in multiple weld passes, routing of the electrical and control cables (e.g. wires) and flow conduits (e.g. water and air tubing) with respect to the articulating arm assembly 60 and canister 20 becomes problematic and may interfere with full rotation of the robotic welder. This creates unique challenges particularly for this onsite "field" welding operation. Rather than requiring an operator to be present at the high radiation dosage area of canister 20 during welding to manually move the cables/conduits out of the way with each rotational pass of the robotic articulating arm assembly 60, a cable-conduit management apparatus 95 is provided which is automatically pivotable and under control of the main controller 100. Thereby requiring no manual intervention at the canister welding location.

Referring to FIGS. 1-16, cable-conduit management apparatus 95 in one embodiment includes a fully closed or partially open tubular body defining a hollow support tube 97 and an organizing channel 96 extending therethrough from one proximal end 95a where the cables/conduits CC enter to another distal end 95b at the robotic articulating arm assembly 60 where the cables/conduits exit the tube. The tube 97 may have an elongated rigid body formed by of either welded or brazed metal section or optionally strong monolithic plastic body. The tube body may have any suitable polygonal or non-polygonal cross-sectional shape (e.g. square, rectangular, circular, etc.) and overall configuration. In top view, the support tube 97 may be linearly straight. A tube centerline CL is defined which extends along the center of tube from end to end in each section (see, e.g. FIGS. 6 and 9). Although the walls of the cable-conduit management apparatus tube are shown as solid, the walls may be partially open (e.g. cage-like) or include openings in other embodiments. In certain embodiments, the support tube 97 may be upwardly open including only a pair of side walls and a bottom wall. Accordingly, numerous variation in the shape and construction of the support tube 97 are possible and does not limit the invention In one embodiment, support tube 97 may have a multi-angled configuration in which proximal end 95a defined by proximal end section 97a is higher than the distal end 95b defined by distal end section 97b. An intermediate section 97c is defined between the proximal and distal end sections 97a, 97c. Each section may be straight as shown in the illustrated embodiment and joined by miter joint if metal is used for the tube body. Elevating the proximal end allows the cables/conduits to avoid becoming snagged on the canister 20 during pivotable movement of the cable-conduit management apparatus 95, while the lower distal end 95b locates the emerging cables close to the base 51 from which they can be routed internally and/or externally along the robotic arms. Channel 96 is configured for routing and retaining a plurality of cables and conduits CC therethrough as shown to the articulating arm assembly 60.

It bears noting at this point that not all cables-conduits are shown on the PRW articulating arm assembly 60 in the figures for purposes of illustration to avoid visually obscuring details of the robotic welder. Any suitable routing of the cables-conduits internally or externally on the PRW 50 may be used. It is well within the ambit of those skilled in the art to select proper cable-conduit routing and means of securement compatible with the rotary and/or liner motions of the robotic arms.

The distal end 95b of support tube 97 is mounted to a rotary actuator 98 (e.g. electric or pneumatic) which provides pivotable motion to the cable-conduit management apparatus 95. Rotary actuator 98 is fixedly attached to base 51. Accordingly, the cable-conduit management apparatus is liftable and moveable for deployment with the base and robotic articulating arm assembly 60 as a single unit.

Figure 6:
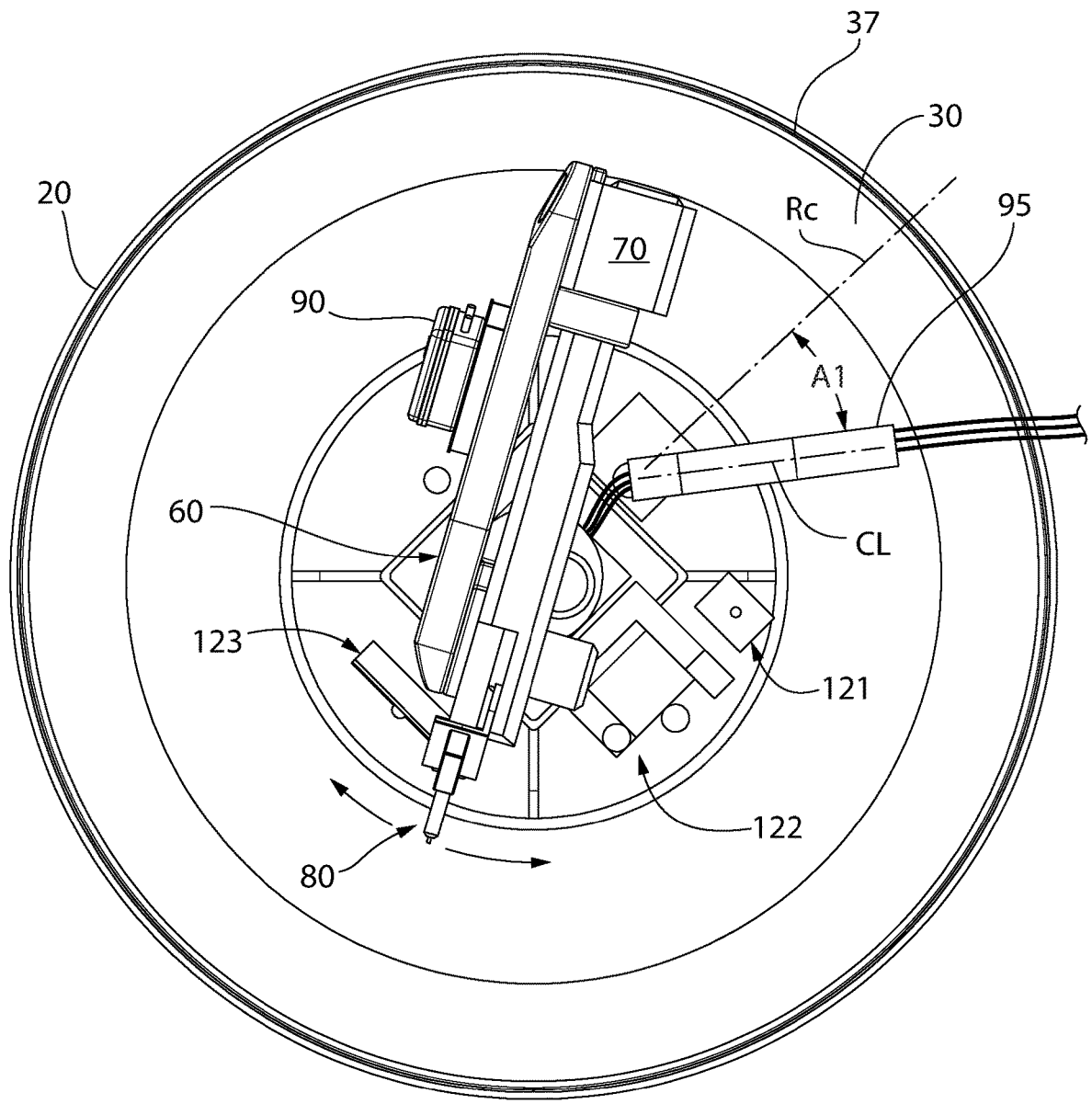
FIG. 6 is a top view of the container and robotic welder of FIG. 1.
Figure 7:
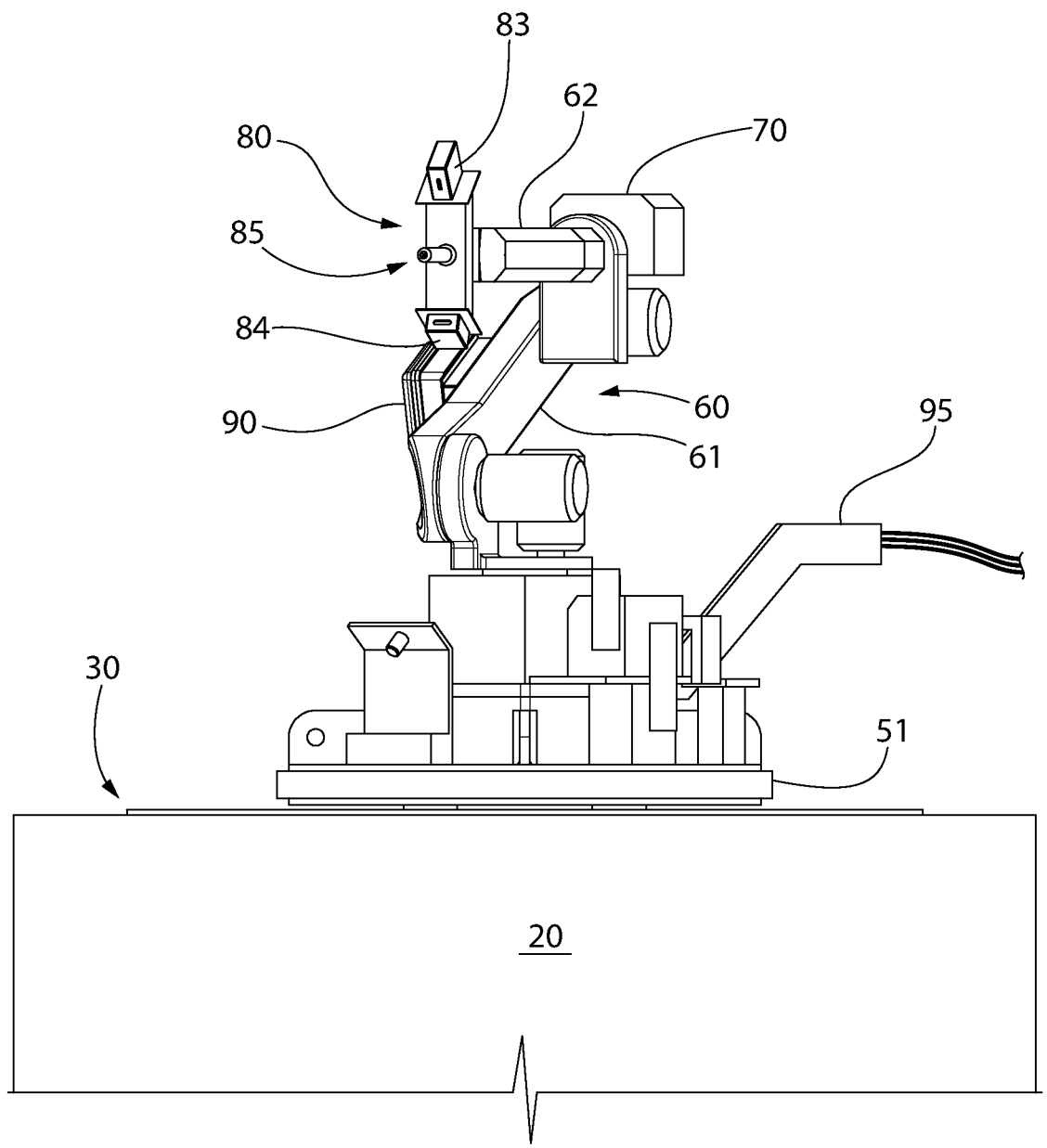
FIG. 7 is a first close-up side view of the container and robotic welder of FIG. 1.
Figure 8:
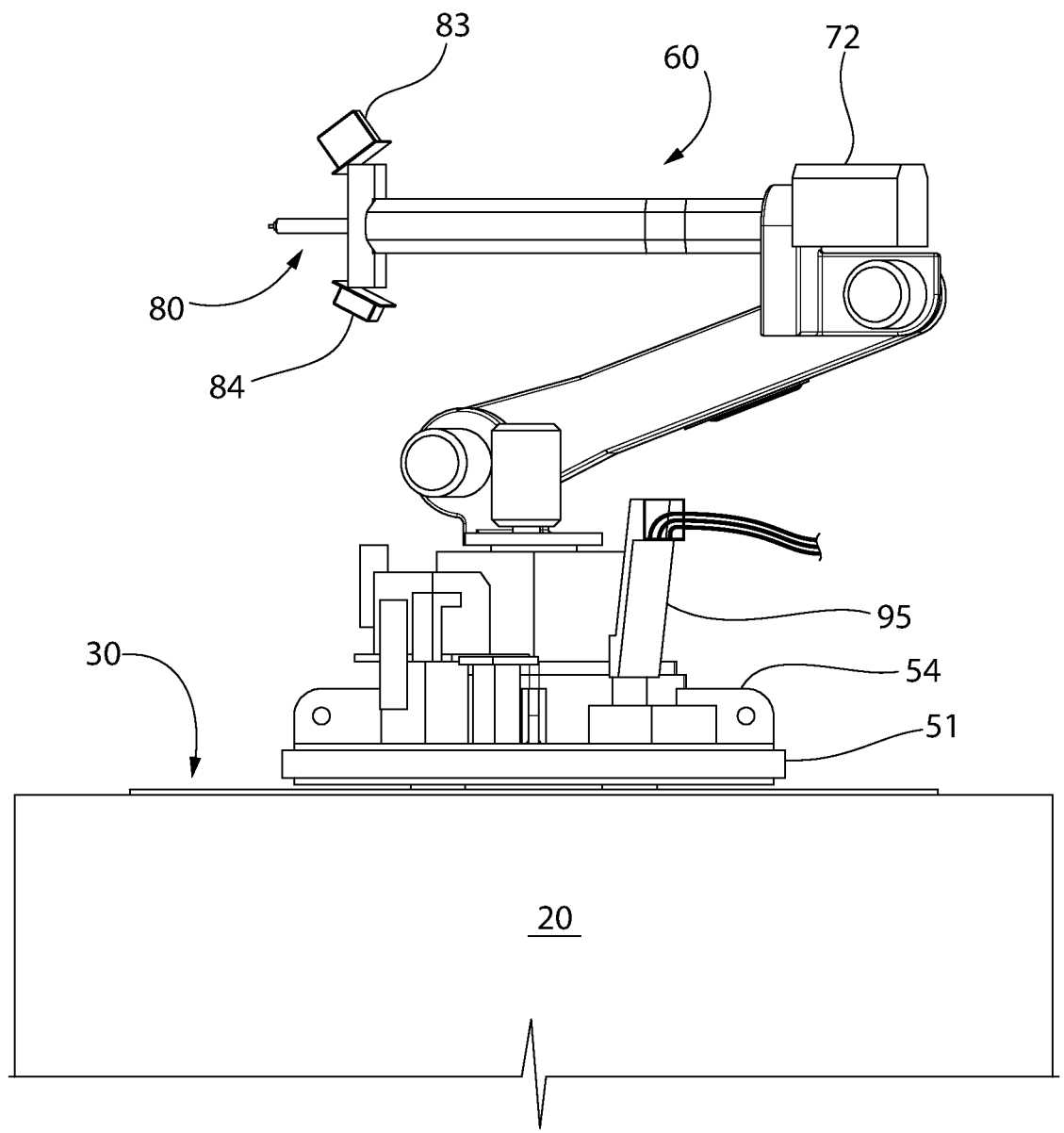
FIG. 8 is a second close-up side view of the container and robotic welder of FIG. 1.
Figure 9:
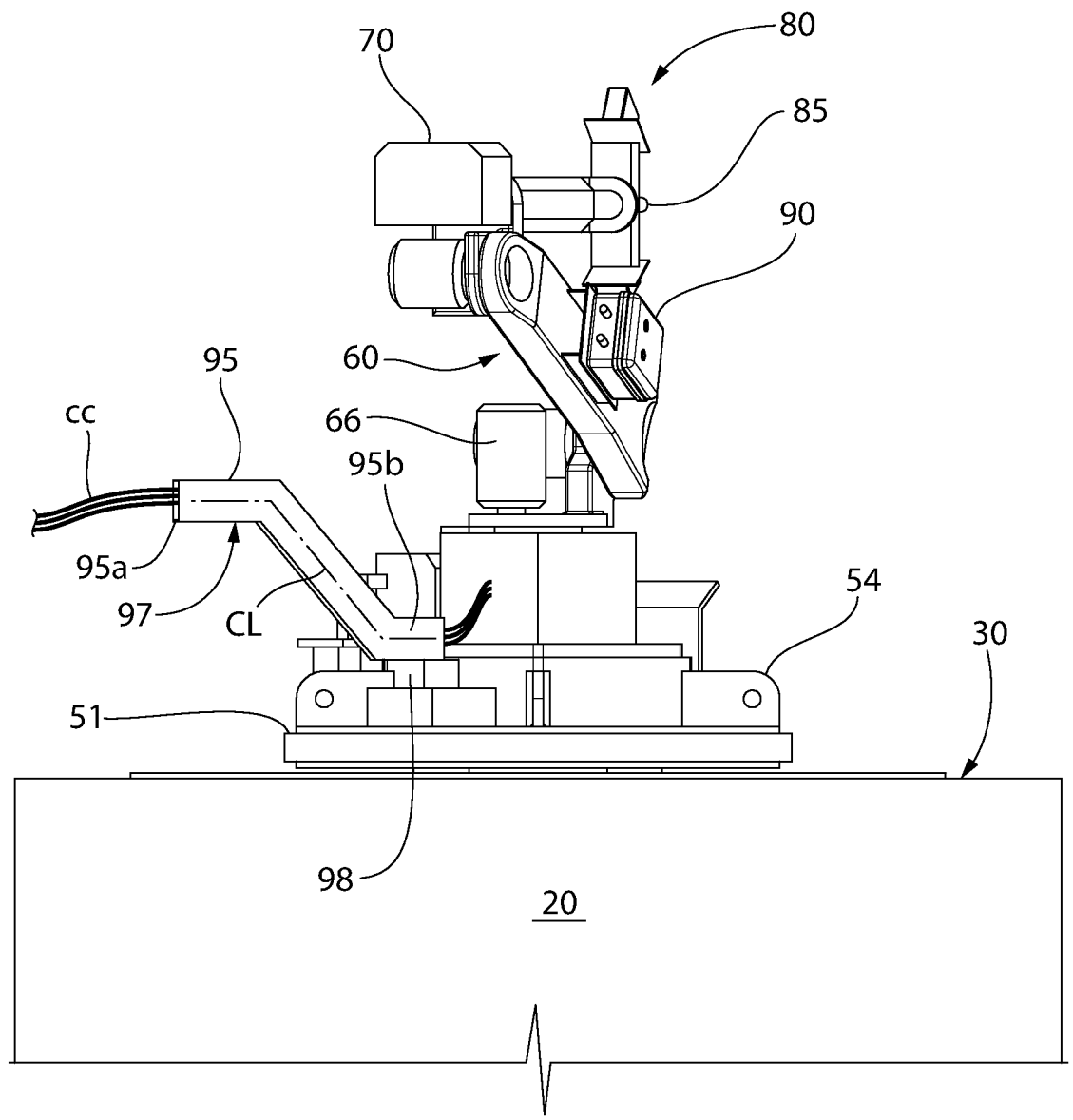
FIG. 9 is a third close-up side view of the container and robotic welder of FIG. 1.
Figure 10:
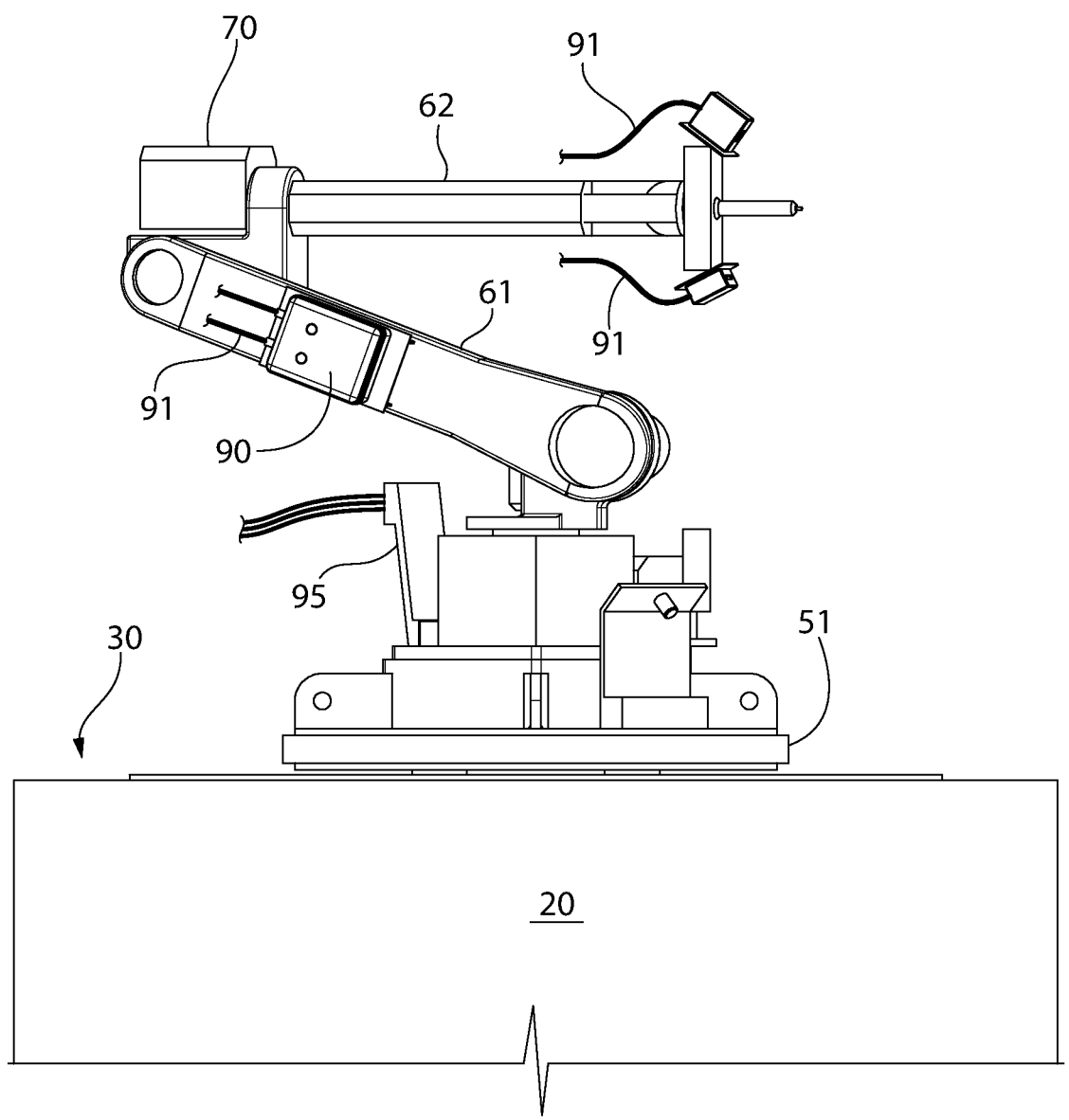
FIG. 10 is a fourth close-up side view of the container and robotic welder of FIG. 1.

In one embodiment, cable-conduit management apparatus is pivotably movable through an angle A1 of about and including at least 10 degrees in either rotational direction with respect the centerline CL of tube 97 and a radial reference line Rc extending from the geometric center of the articulating arm assembly 60 defined by the arms' main rotational axis defined rotary drive mechanism through the pivot axis of the cable-conduit management apparatus 53 defined by rotary actuator 98 (see, e.g. FIG. 6). Accordingly, the support tube 97 of cable-conduit management apparatus 95 is movable through a total arcuate path of about and including at least about 20 degrees but less than 360 degrees. In a certain embodiment, the cable-conduit management apparatus 95 may be moveable in a total arcuate of about 90 degrees (i.e. A1=45 degrees). The pivotable action of the cable-conduit management apparatus 95 allows the main controller 100 to pivot the apparatus from a first angular position to a second angular position to avoid interference with the robotic articulating arm assembly 60 when forming the hermetic seal weld 31. Operation of the cable-conduit management apparatus 95 is fully described below in conjunction with description of the welding process or method for sealing nuclear waste in a container using PRW 50.

According to another aspect of the present disclosure, the PRW 50 further includes a plurality of weld preparation stations 120 arranged around and on the base 51 of the robotic welder. After completion of each welding pass around the circumferential weld joint 37, main controller 100 is programmed to move the articulating arm assembly such that welding head 80 is transported to and visits each weld preparation station as part of the preprogrammed welding plan. This allows the weld head to be prepared and cleaned for the next welding pass. Heretofore when seal welding the lid to the nuclear waste canister shell, these weld preparations had to be performed manually in the field thereby exposing workers to radiation.

Figure 17C:
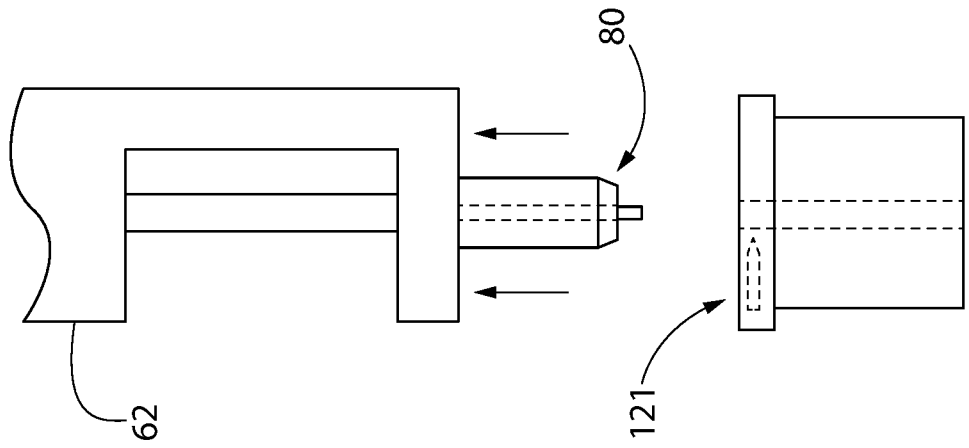
FIGS. 17A-C are sequential views of a welding wire cutter station of the robotic welder showing the process of trimming the welding wire.
Figure 17B:
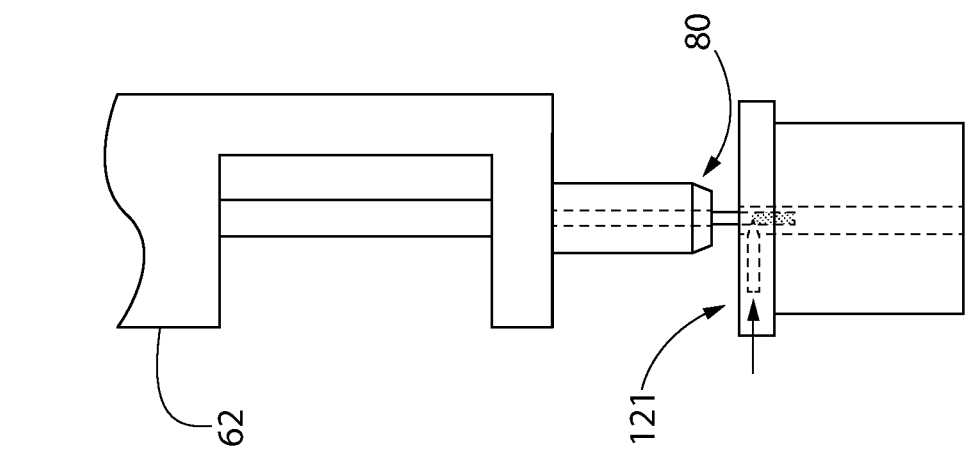
Figure 17A:
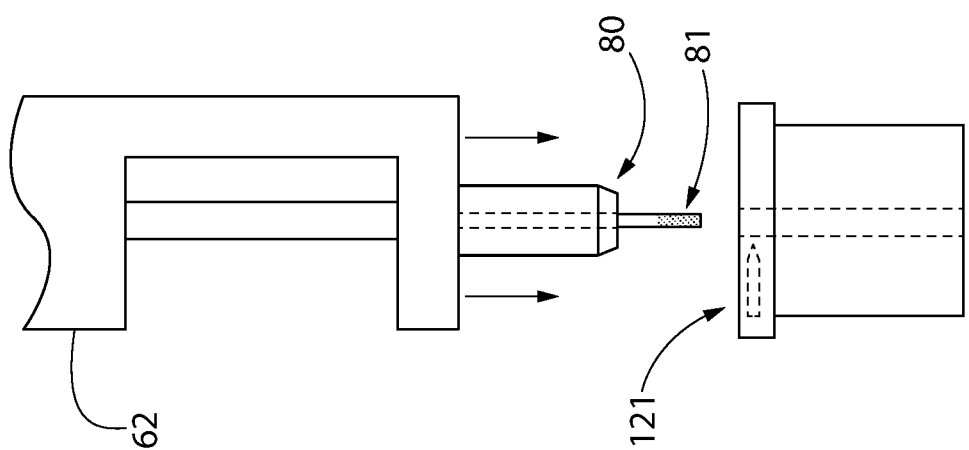
Figure 18:
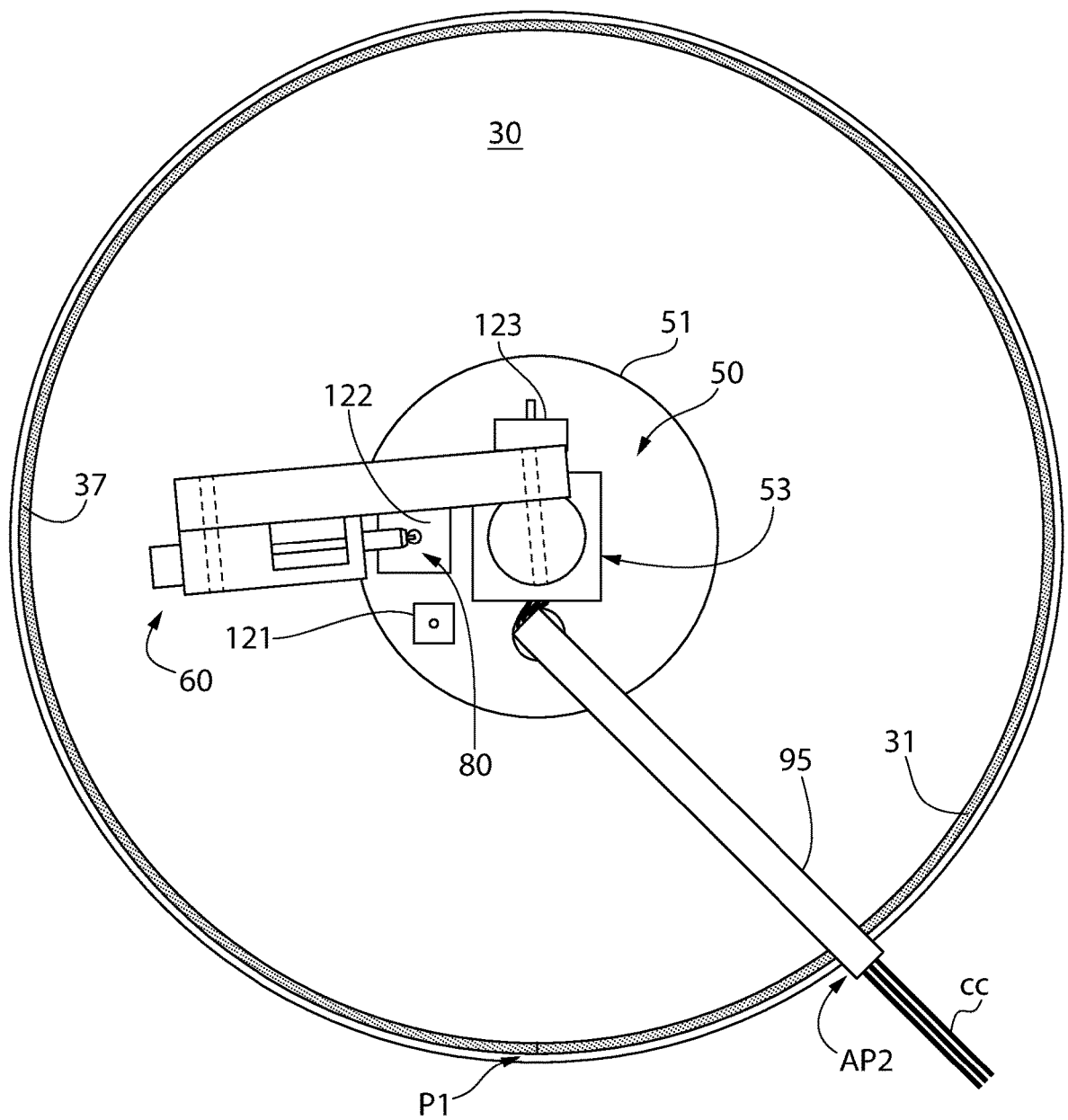
FIG. 18 is a fifth top view in a welding process sequence for making a lid-to-shell weld of the container.
Figure 19:
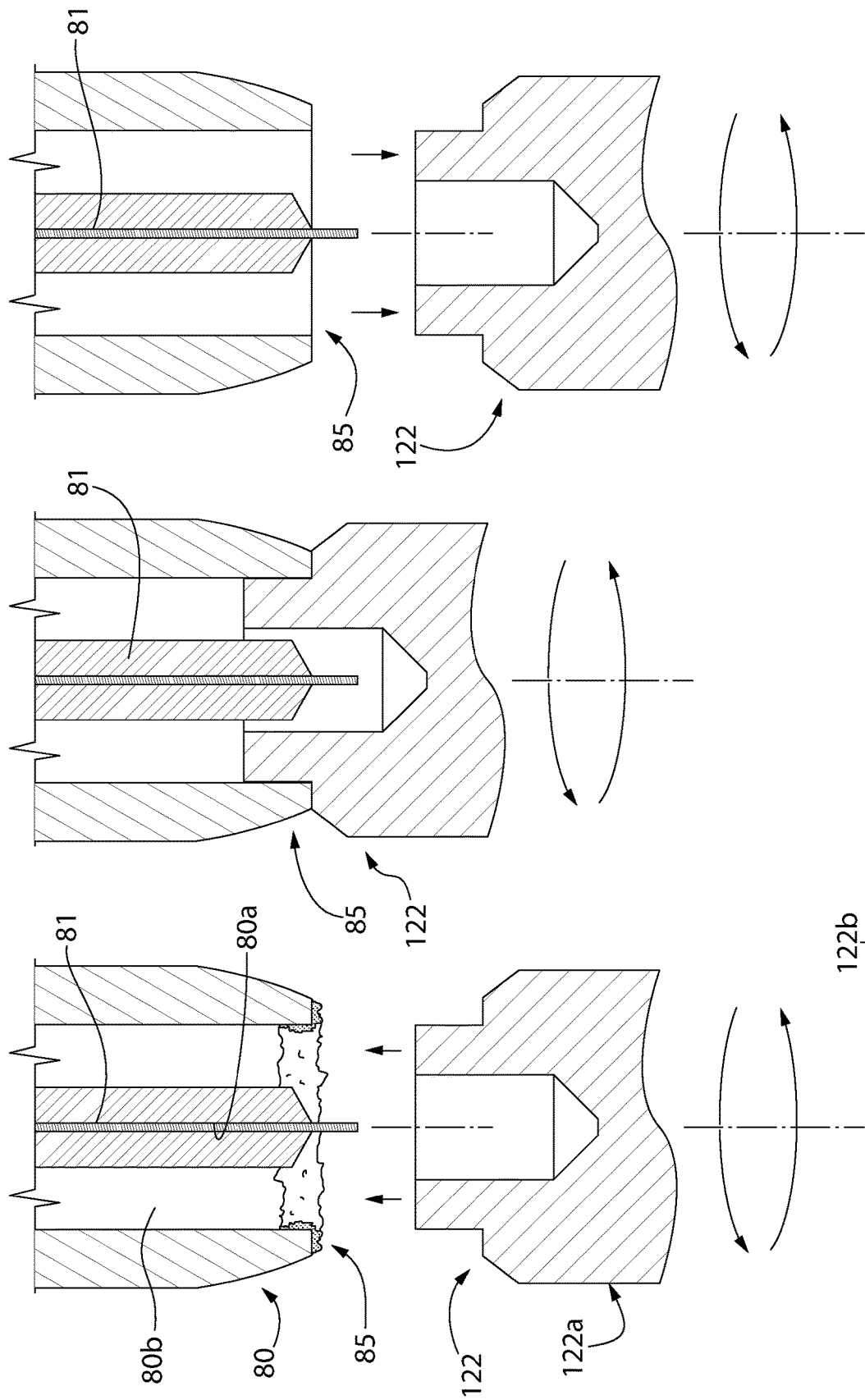
FIGS. 19A-C are sequential views of a welding head reaming station showing the process of reaming the welding head.

With primary reference to FIGS. 1-12, in certain embodiments the weld preparation stations 120 may include without limitation a welding wire cutter station 121, a welding head reaming station 122, and an anti-spatter liquid misting station 123. The weld preparation equipment for each station is commercially-available. The stations may be located in one or more quadrants of the PRW base 51 (best shown in FIG. 6) and spaced angularly apart far enough to provide clearance for the welding head 80 assembly and appurtenances (e.g. joint tracking sensor 83, camera 84, bracket 82, etc.) to visit each station. Referring specifically to FIGS. 17A-C which are sequential operating views, wire cutter station 121 includes a movable wire cutter or knife blade(s) 121a which trims the welding wire 81 to a predetermine length optimized for welding the lid 30 to canister 20. Referring specifically to FIGS. 19A-C which are sequential operating views, welding head reaming station 122 cleans and burnishes the tip 85 of the weld head nozzle to remove weld splatter and other deposits thereon. Station 122 includes a rotatably reamer tool head 122a configured especially for cleaning the nozzle with rotary action. A rotary drive 122b (represented schematically by the dashed box) rotates the tool head 122a at preselected speed (RPM). The tool head is configured to avoid damaging the welding wire 81 trimmed at the first cutting station 121. In the final station with particular reference to FIGS. 21A-B, the anti-spatter misting station 123 sprays the cleaned welding head 80 with a mist of anti-spatter liquid from a pressurized container or pump of the liquid fluidly to spray nozzle 123a supported by a support stand 123b affixed to PRW base 51. The liquid coating or film deposited on the head 80 helps resist adhesion of weld splatter. After visiting this last station, the second welding pass and welding is ready to resume. The foregoing weld preparation sequence is preferably followed after each welding pass by the PRW 50.

In addition to the servo drive motor 66 of the main rotary drive mechanism 53 of PRW 50 and distal arm servo drive mechanism 68 previously described herein, a plurality of additional servo drive motors 64 may be incorporated into the articulating arm assembly 60 of the robotic welder where needed at appropriate joint locations to produce the desired 6 degrees of freedom rotational and linear movements of the various arm assembly segments. The servo drive motors and mechanisms are standardly provided with the articulating arm assembly 60 package by the robot manufacturer.

PRW 50 is flexible to employ any of the conventional semi-automatic welding processes used in the art. The welding processes may include for example, without limitation, Gas Metal Arc Welding (GMAW), Gas Tungsten Arc Welding (GTAW), Flux-Cored Arc Welding (FCAW), Submerged Arc Welding (SAW), and the variations thereof.

Figure 26:
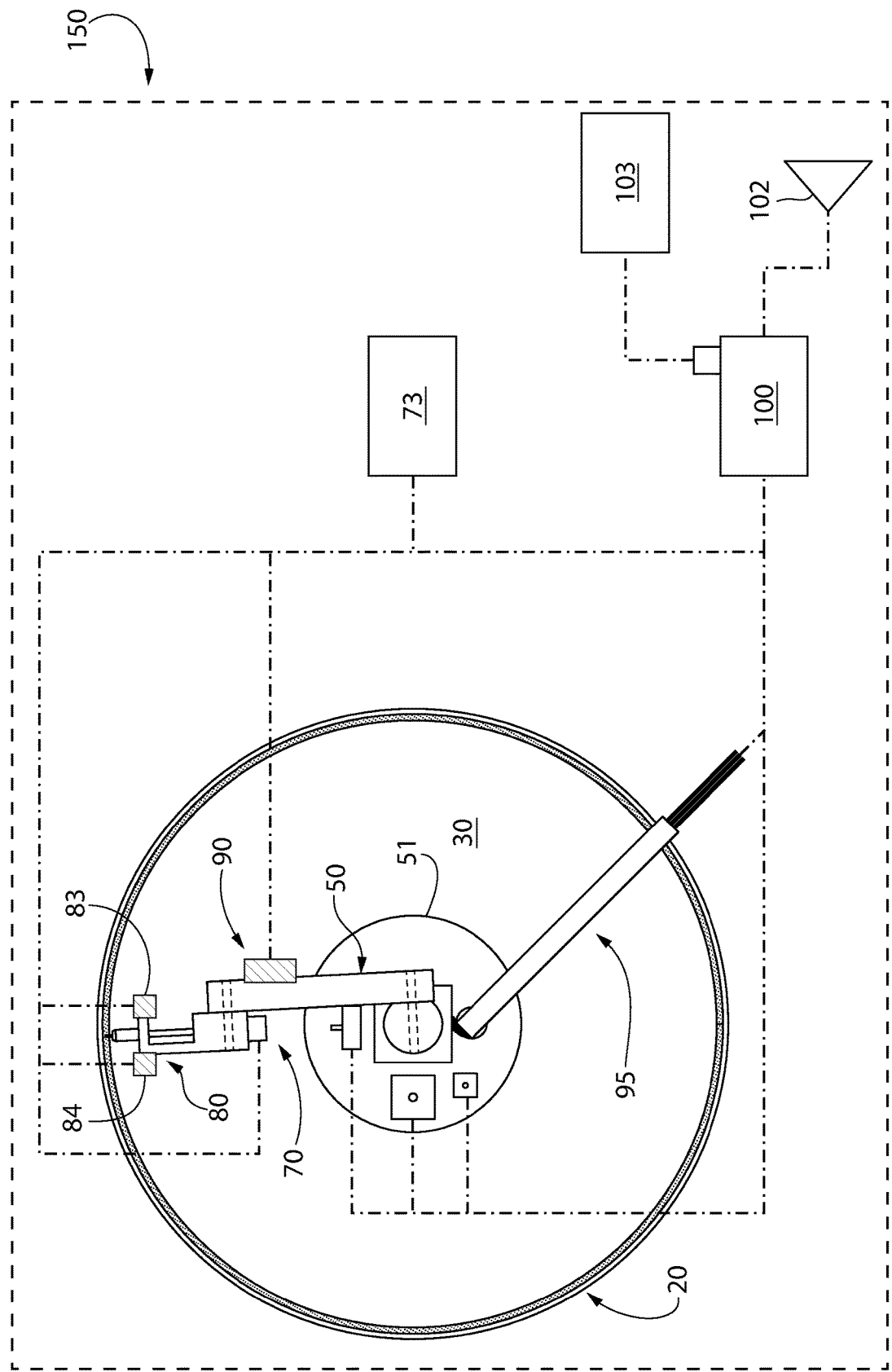
FIG. 26 is a schematic control diagram showing the control system 10 of the robotic welding system.

FIG. 26 is a welding system schematic control diagram showing control system 150 of the robotic welding system described herein. A configurable welding process electronic management unit in the form of a commercially-available processor-based main controller 100 may be used. Main controller 100 is configurable and operable to automatically coordinate, synchronize, and sequence operation of the PRW 50 and the ancillary equipment for unified control of the entire remotely-operated and fully automated welding process to form the complete canister lid-to-shell circumferential hermetic seal weld 31. The controller 100, configured with program instructions (e.g. control logic/software) stored therein and executed by its programmable processor, thus controls operation of the PRW 50 and its ancillary components via suitable wired and/or wireless communication links 101 as shown (represented by dot-dash-dot lines). It is well within the ambit of those skilled in the art to configure the program instructions to direct the robotic welder and operation of its related ancillary equipment in the manner described herein without further undue elaboration.

Programmable main controller 100 may include all the customary components and appurtenances necessary for a fully functional electronic control device, including generally, for example without limitation, a programmable processor, a bus, input/output devices, graphical user interfaces or displays 102 (e.g. touchscreen or non-touchscreen), wired and/or wireless communication interface devices (e.g., Wi-Fi, Bluetooth, and/or LAN), volatile memory, non-volatile memory, non-removable and/or removable data storage (e.g. hard drive, USB, etc.), electric power supply, etc. The non-volatile memory may be any type of non-removable or removable semi-conductor non-transient computer readable memory or media. Both the volatile memory and the non-volatile memory may be used for saving data received by the controller 100 via various sensors or from other devices, for storing program instructions (e.g. control logic or software) implemented by the controller, and storing operating parameters (e.g. baseline parameters or set points) associated with operation of the welding system as some non-limiting examples. Main controller 100 described herein may be any central processing unit (CPU), processor, computational, or other programmable device configured for executing computer program instructions (e.g., code). The controller and various microcontrollers may be embodied in a computer and/or server hardware of any suitable type (e.g., desktop, laptop, notebook, tablets, cellular phones, etc.). Suitable controllers are commercially-available.

As shown in FIG. 26, the programmable main controller 100 may further be communicably and operably coupled to an external processor-based personal electronic device 103 (e.g. personal desktop/laptop computer, tablet, smart phone, etc.) via a communication interface or module 104 configured for wired and/or wireless two-way communications using any suitable wireless protocol. The communication module 104 comprises a serial communication port thereby providing an input/output interface which is configured to enable two-way communications between the external personal electronic device 103 and the microcontroller 100. The personal electronic device 103 in some implementations may be used as an input device to program the controller 100.

Advantageously, the main controller 100 provides remote control of the PRW welding system and process beyond the high radiation dosage area in the immediate vicinity of the nuclear waste canister 20 at the nuclear facility site.

A method or process for hermetically sealing nuclear waste in a container in an automated and remotely controlled manner using the portable robotic welder (PRW) 50 will now be briefly described. Notably, the entire process described below is performed onsite at end user's nuclear plant or facility site outside of the controlled shop conditions of the equipment manufacturer. General reference should be made to FIGS. 1-12 and 26 throughout the discussion to follow, with additional reference to specific figures where applicable as noted. Advantageously, this automated welding process minimizes exposure of personnel to the high level gamma and neutron radiation emitted by the nuclear waste W stored in the canister 20.

To start the method or process, lid 30 is first placed on top of the nuclear waste canister 20, thereby forming the open circumferential weld seam or joint 37 therebetween. PRW 50 is next lifted via a motorized crane or hoist and positioned on top of the lid 30. Preferably, the base 51 of PRW 50 is positioned as close as possible to the geometric center of lid 30 which coincides with vertical centerline Vc of canister 20. However, the PRW need not be perfectly positioned at the center of the lid since the main controller 100 can automatically compensate for off-center positioning and accordingly direct the articulating arm assembly 60 to position the welding head 80 at the weld joint 37 via the touchless joint tracking sensor 83. In one embodiment, the PRW 50 may be bolted to lid 30 via the available bolting 54.

If not already done so before the lid placement step above, the main controller 100 is activated to initiate the weld process software/program instructions and establish communication links to the PRW 50 which is energized. The welding head 80 air and water cooling system may begin operation at this time. The PRW 50 is ready to begin welding under remote operation directed by controller 100 without human presence in the high radiation dosage vicinity of the canister 20. Unless specifically noted otherwise, the method/process steps which follow below are all implemented automatically by the main controller 100 via executing its programming.

Figure 5B:
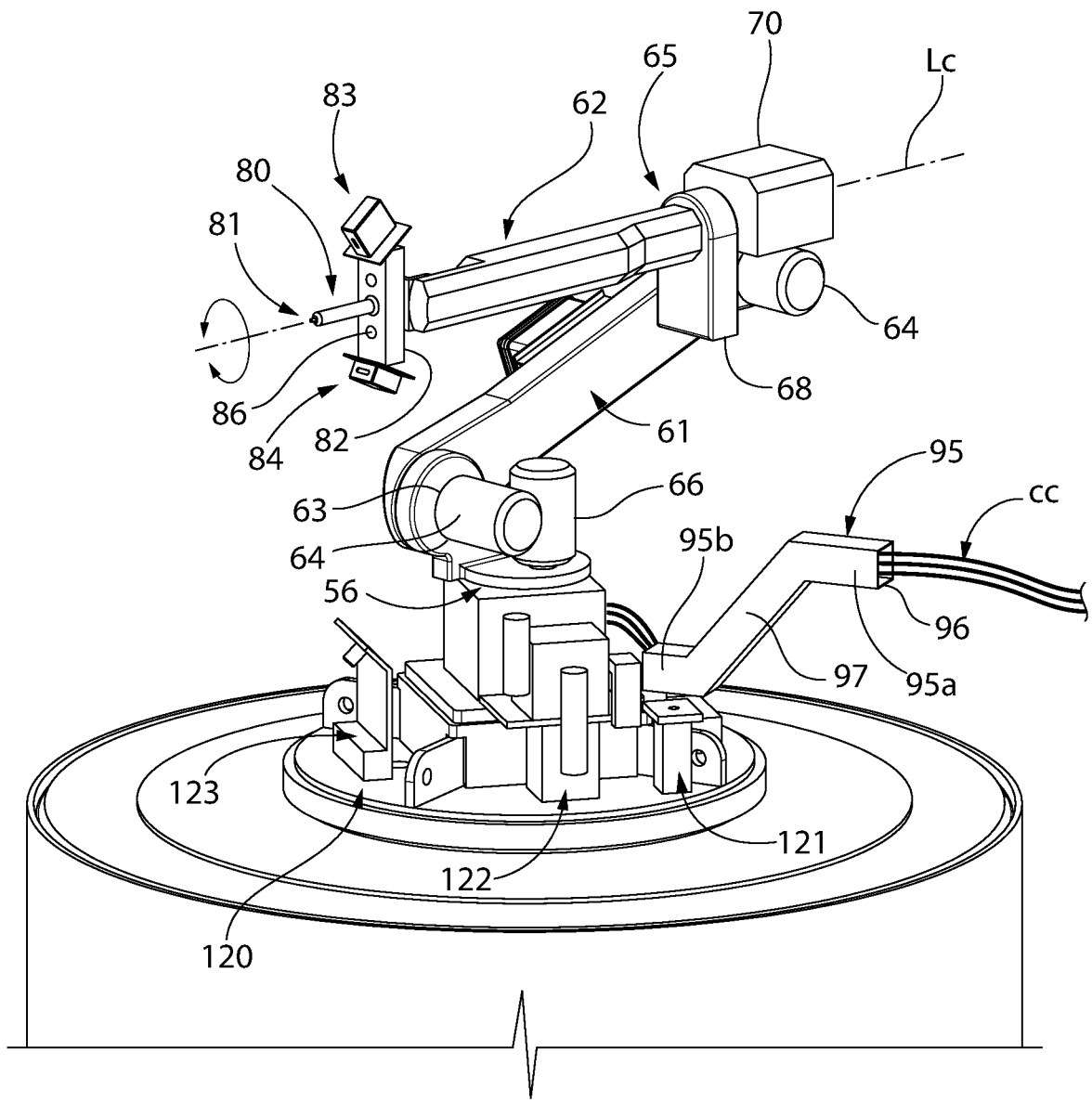
FIG. 5B is a detailed view taken from FIG. 3.
Figure 11:
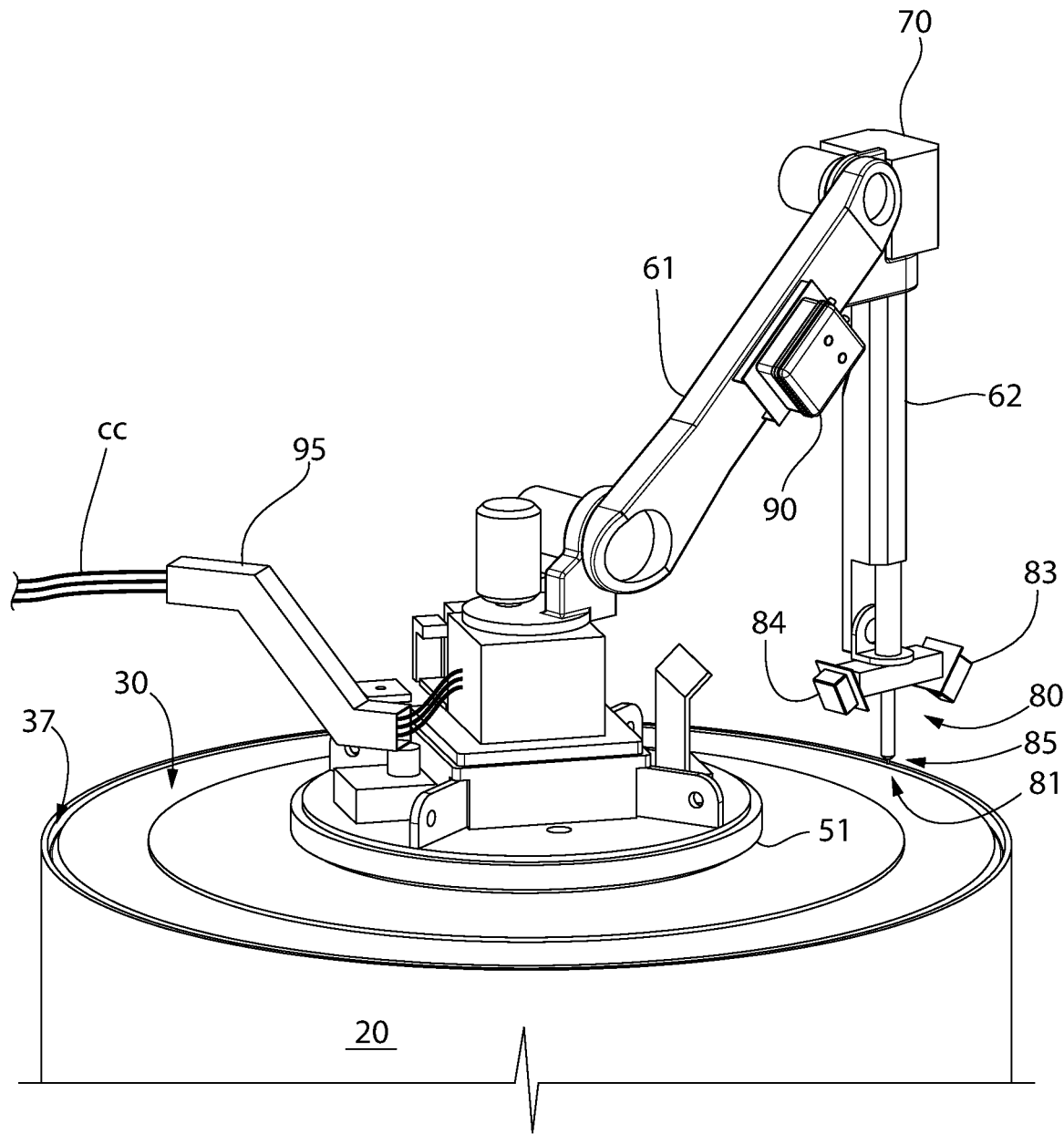
FIG. 11 is a first close-up perspective view thereof.
Figure 12:
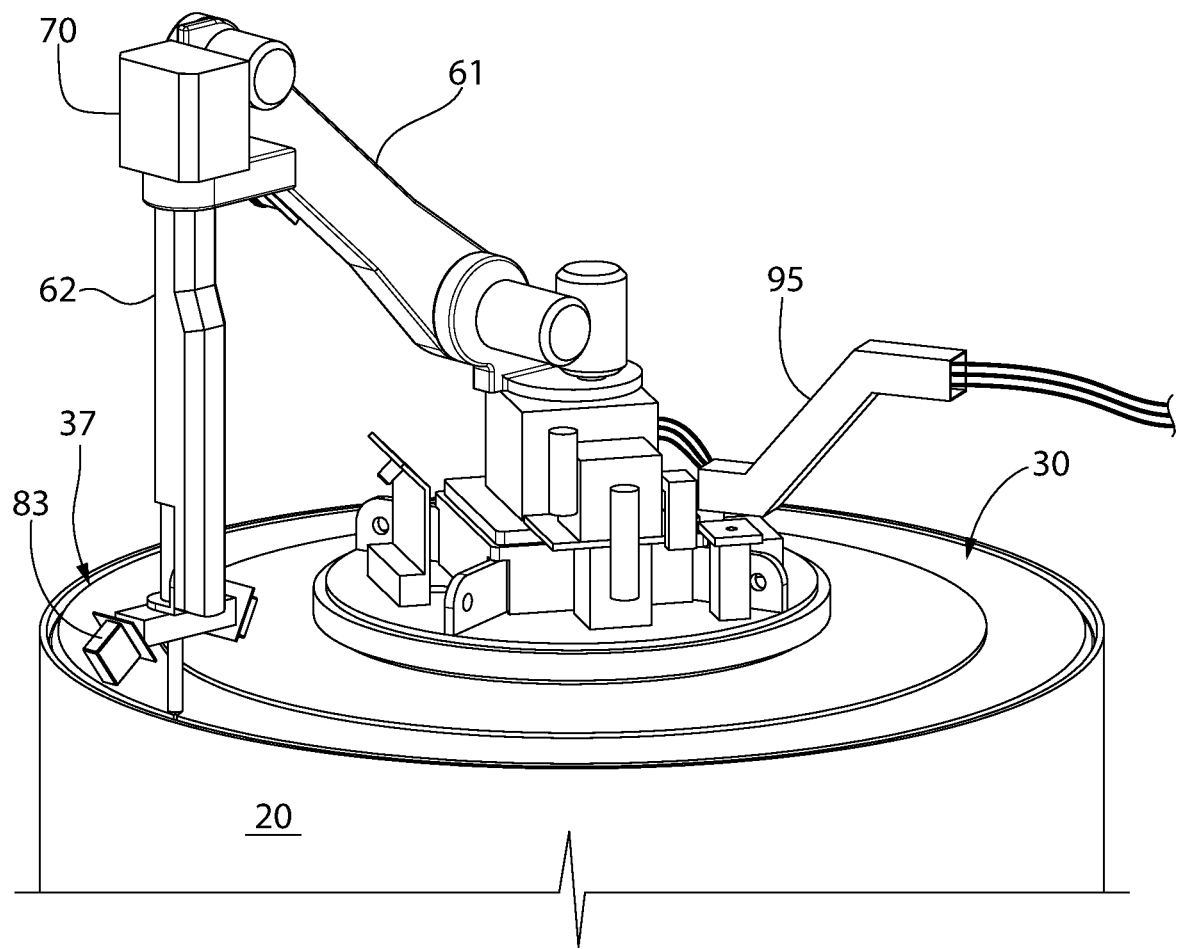
FIG. 12 is a second close-up perspective view thereof.
Figure 13:
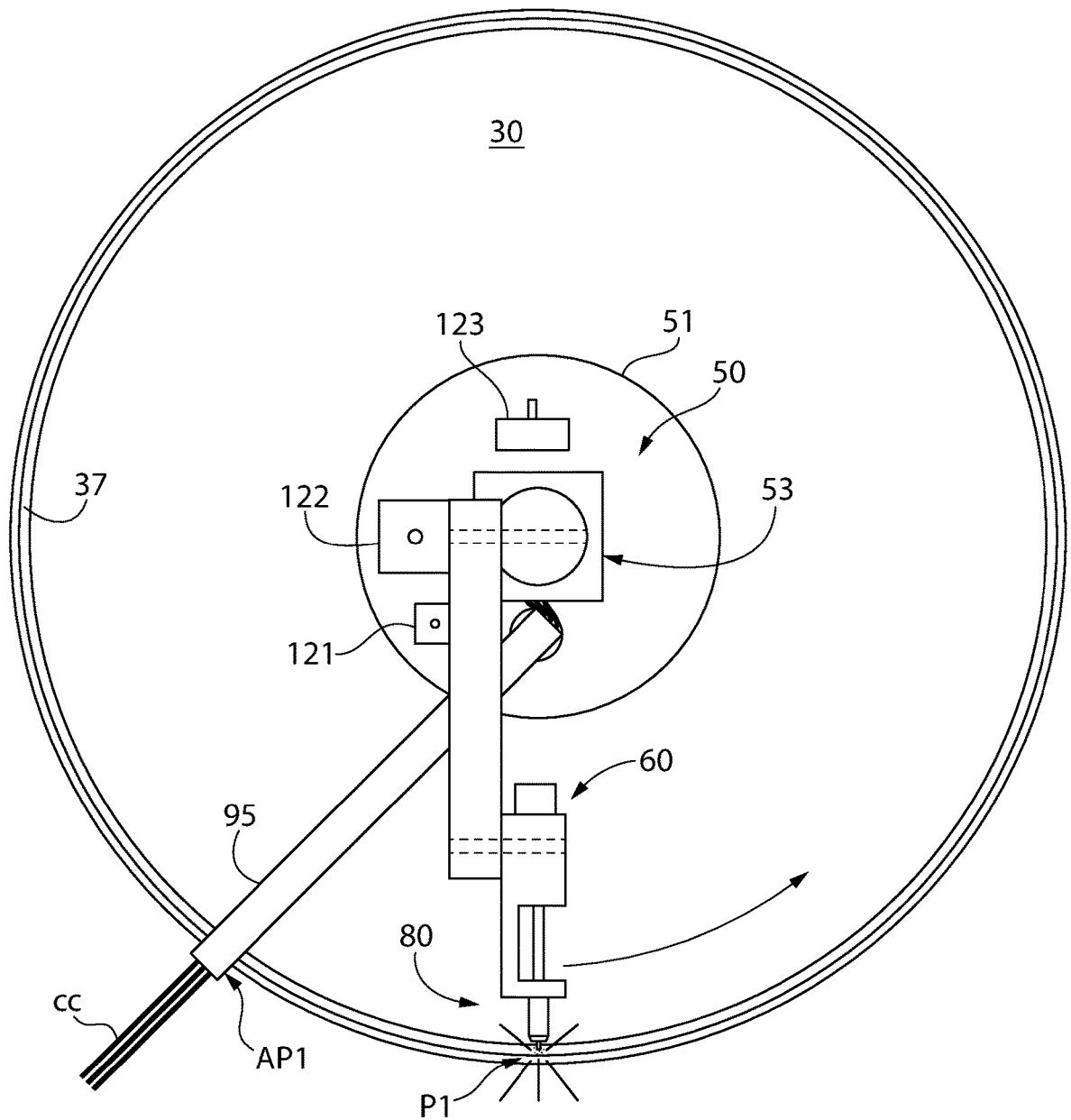
FIG. 13 is a first top view in a welding process sequence for making a lid-to-shell weld of the container.

The automated welding operation steps include the main controller 100 first locating the weld joint with the touchless joint tracking sensor 83 of the vision system on the welding head 80 by moving the articulating arm assembly 60 from an inward folded retracted positioned seen in FIGS. 5A-B (used to transport and lift the PRW on top of the canister) to an outwardly extended position seen in FIGS. 11 and 13. The welding head is positioned at a first starting point P1 at the circumferential weld joint 37 (FIG. 13) via the main controller moving the articulating arm assembly. The cable-conduit management apparatus 95 is shown located in a first angular position AP1 on spaced apart on a first side (left in FIG. 13) of first starting point P1.

If the welding plan to be automatically developed by the controller via the joint tracking sensor 83 scanning weld joint 37 is to be performed using the first "advanced mapping" approach previously described herein, the controller rotates robotic articulating arm assembly 60 a full 360 degrees around the weld while the sensor 83 maps and measures the weld geometry of the entire circumferential weld joint. Once the plan is formulated, the main controller 100 performs the welding operation in the manner described below.

If the welding plan is to be developed on-the-fly by controller 100 using the second "real-time mapping" approach previously described herein, the welding operation is ready to commence. Either approach to developing the welding plan may be used.

To commence welding, main controller 100 instructs the PRW 50 to rotate the articulating arm assembly 60 and welding head 80 in a first rotational direction (counter-clockwise in FIG. 13) of the circumferential welding path from the first starting point P1 around the entire weld joint 37 back to first starting point P1, thereby completing a full 360 degree first revolution of the articulating arm assembly. This completes the first welding pass around the weld joint. As the weld head 80 rotates, weld material from welding wire 81 is simultaneously deposited and laid (i.e. first weld bead) in the circumferential weld joint 37 during the first revolution. The weld arc is protected by the gas shield emitted from the weld head 80. The welding process is monitored remotely via camera 84 on the weld head to allow a human operator to oversee the operation for a radiation safe distance.

Figure 14:
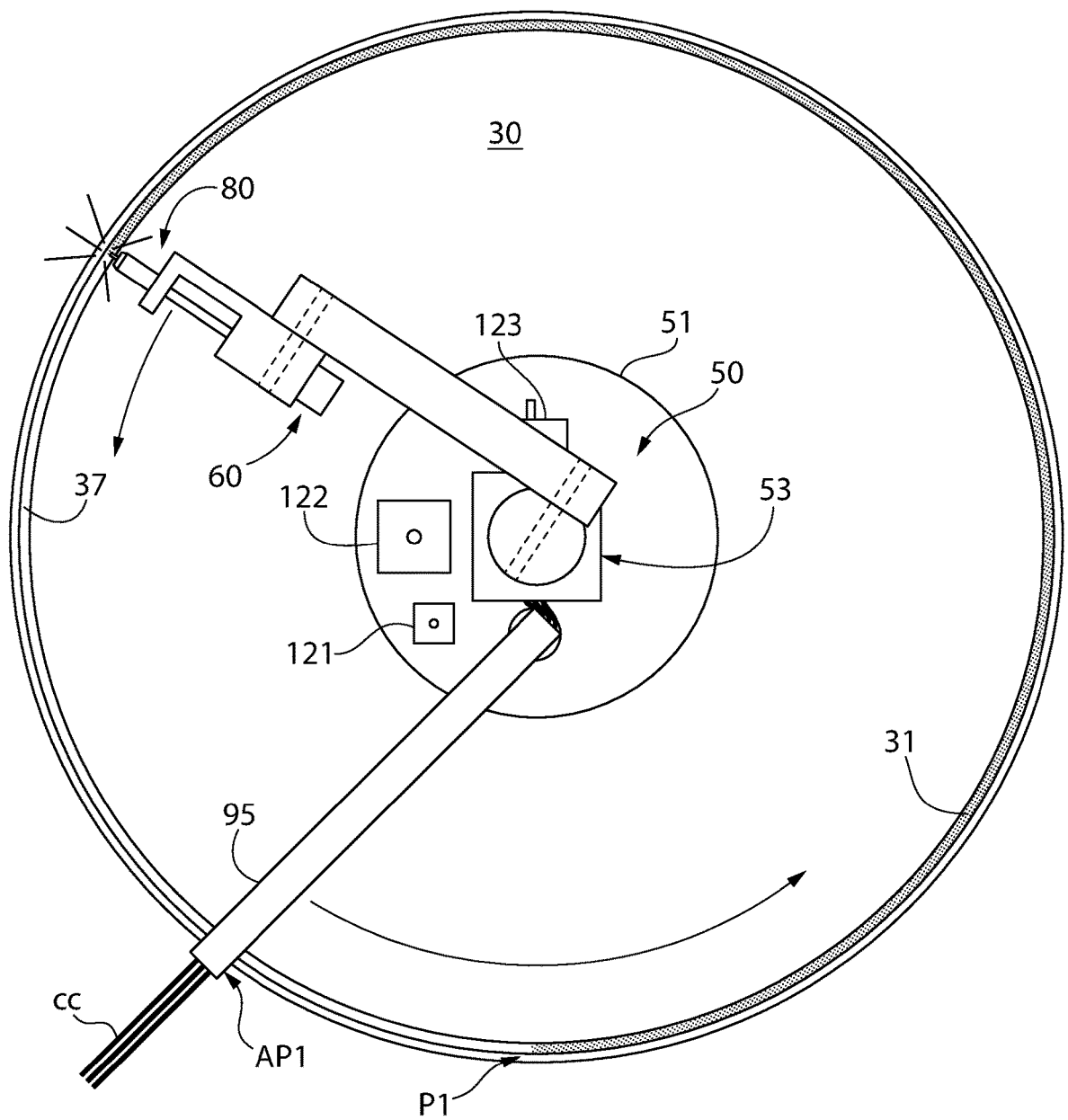
FIG. 14 is a second top view in a welding process sequence for making a lid-to-shell weld of the container.
Figure 15:
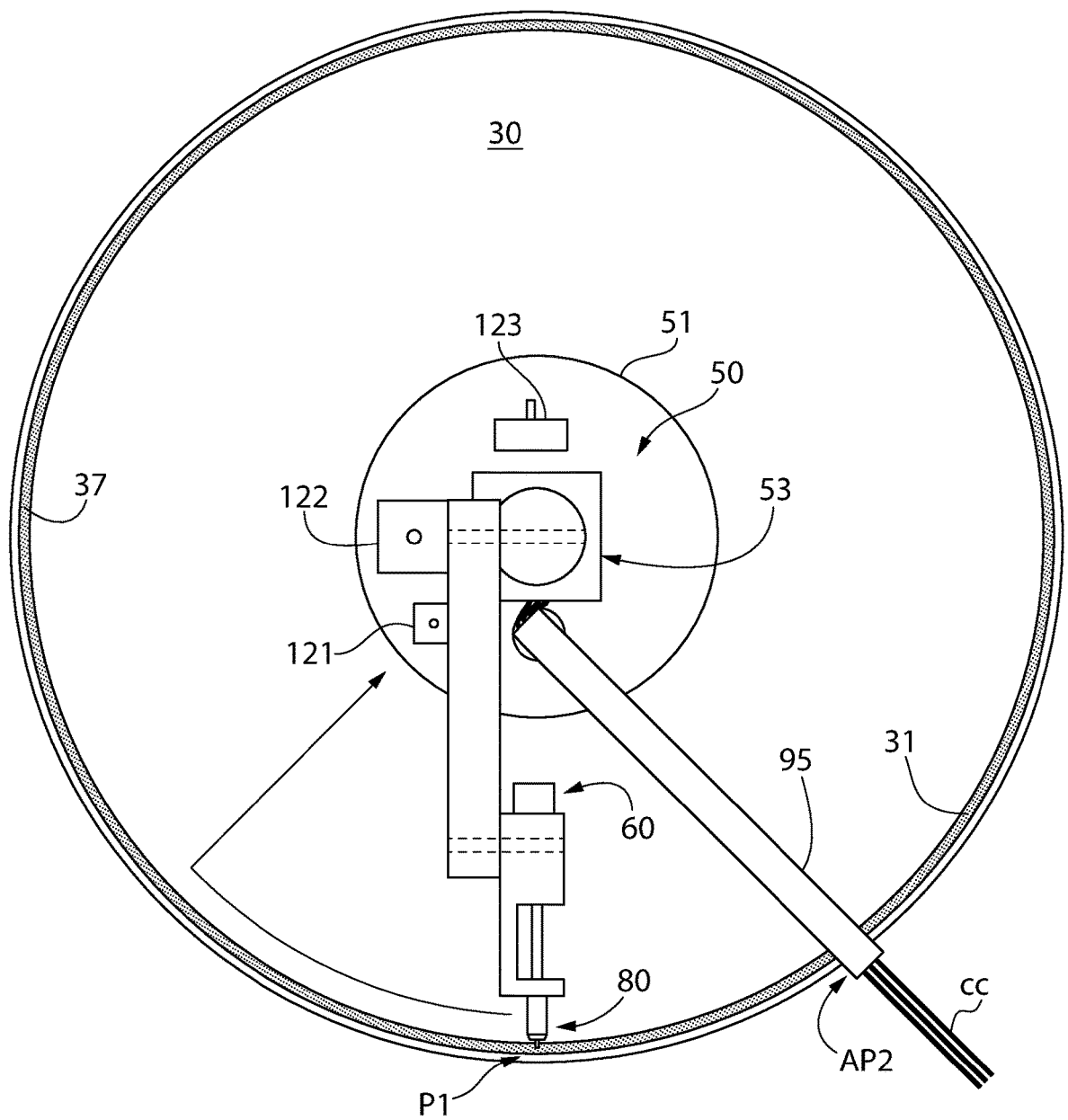
FIG. 15 is a third top view in a welding process sequence for making a lid-to-shell weld of the container.

As shown in FIGS. 14-15, during the foregoing first revolution of weld head 80 while the PRW 50 is welding, the controller automatically moves cable-conduit management apparatus 95 to a second angular position AP2 spaced apart on an opposite second side (right in FIG. 15) of first starting point P1. This ensures that the cable-conduit management apparatus will not block and prevent the robotic articulating arm assembly 60 from traveling back to the first starting point P1 to complete the first full 360 welding pass and first weld bead. It bears noting that weld bead material in each welding pass is continuous and contiguous in structure from start to finish to progressively fully fill the weld joint with the hermetically sealed butt weld.

Figure 16:
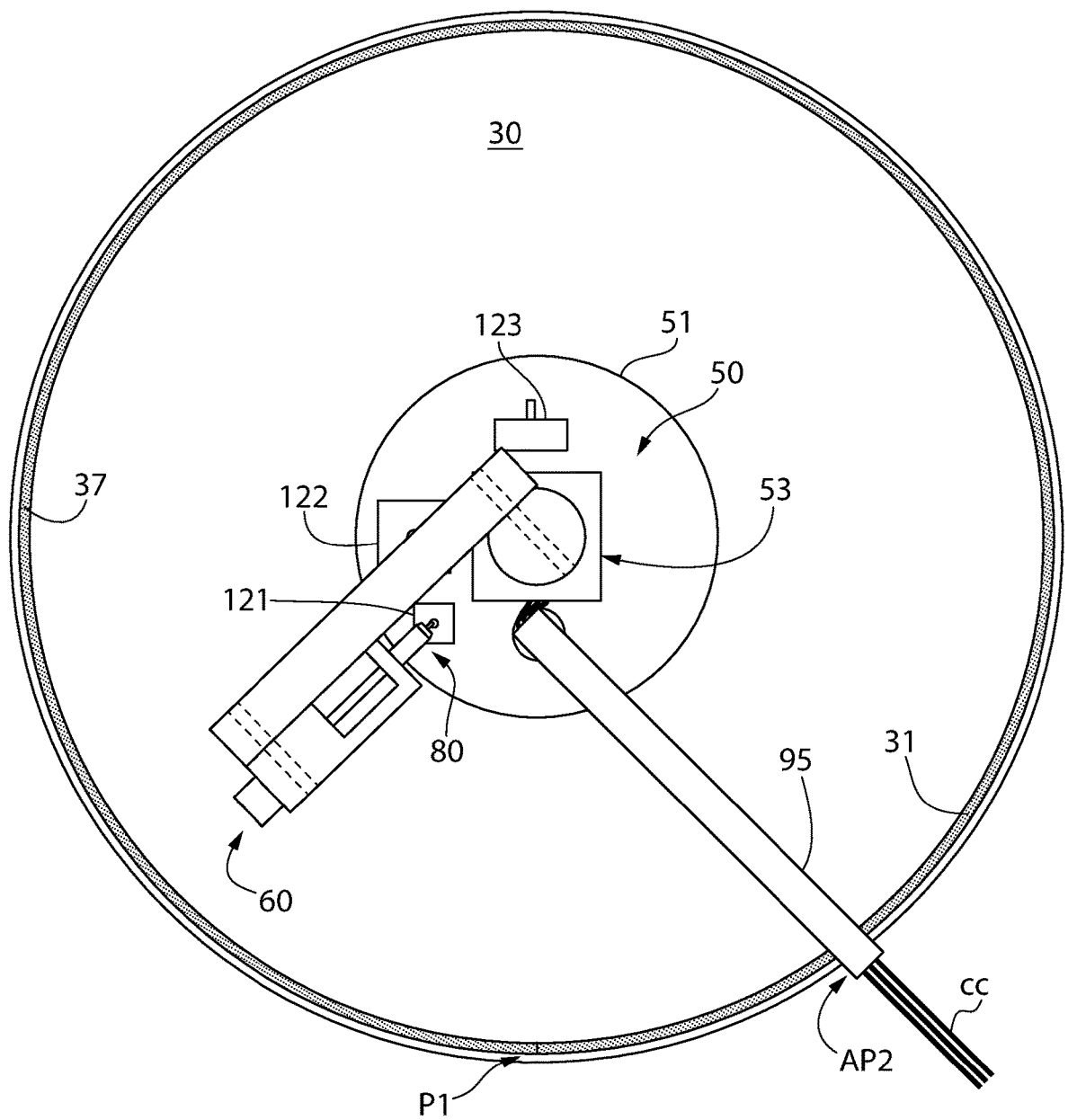
FIG. 16 is a fourth top view in a welding process sequence for making a lid-to-shell weld of the container.
Figure 20:
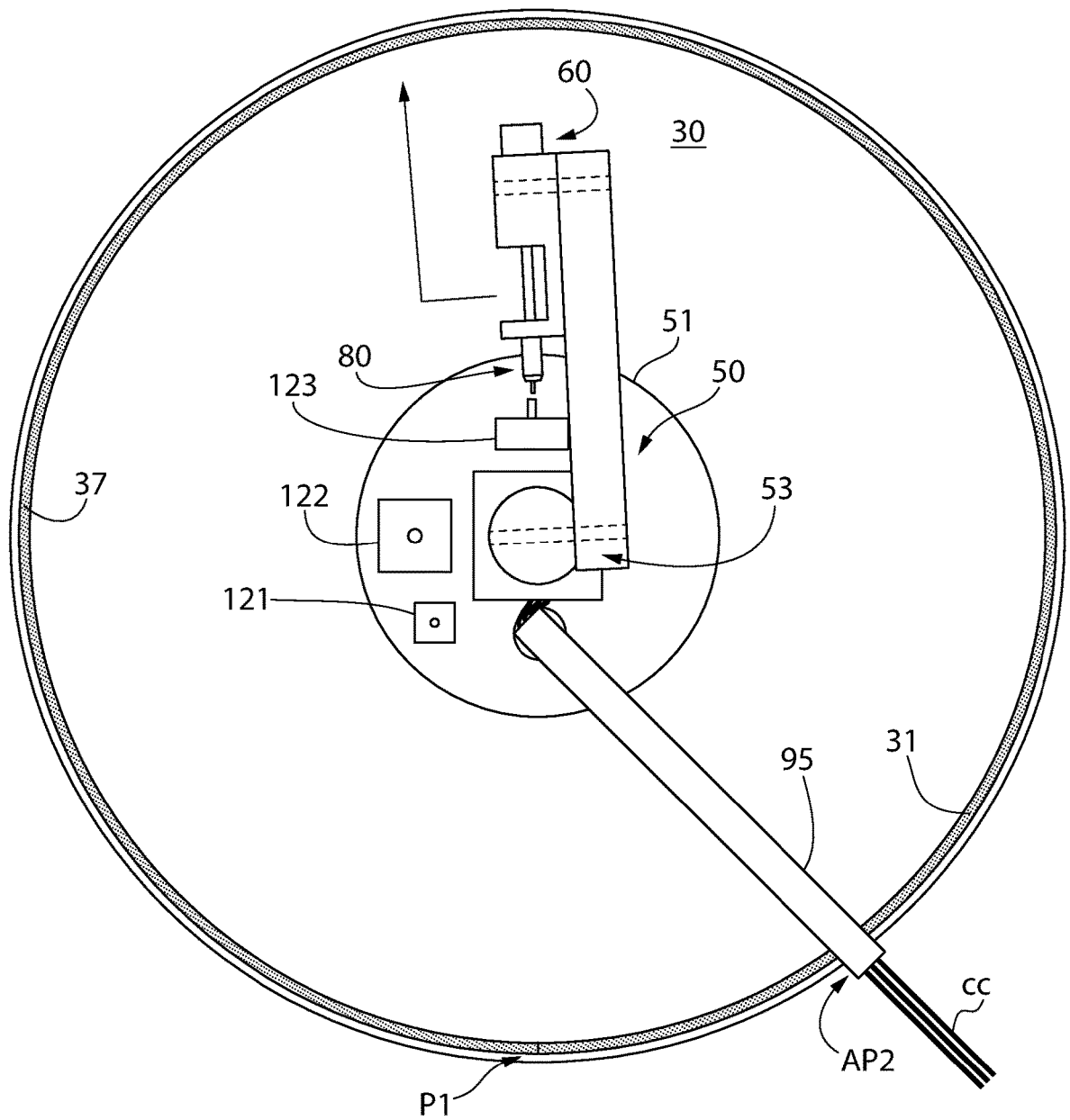
FIG. 20 is a sixth top view in a welding process sequence for making a lid-to-shell weld of the container.
Figure 21A:
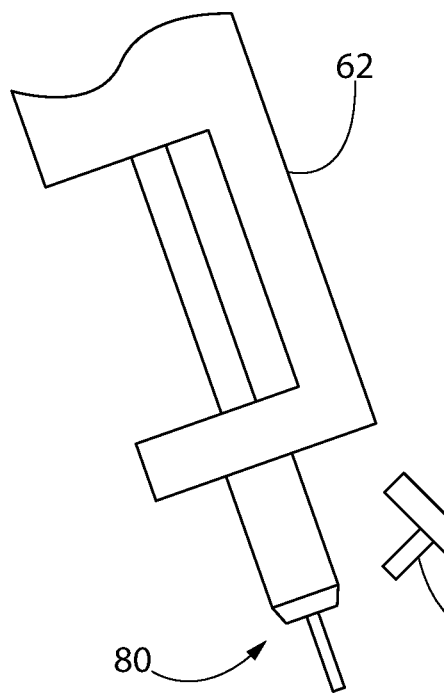
FIGS. 21A-B are sequential views of an anti-spatter liquid misting station of the robotic welder showing the process of spraying the welding head with anti-spatter liquid.
Figure 21B:
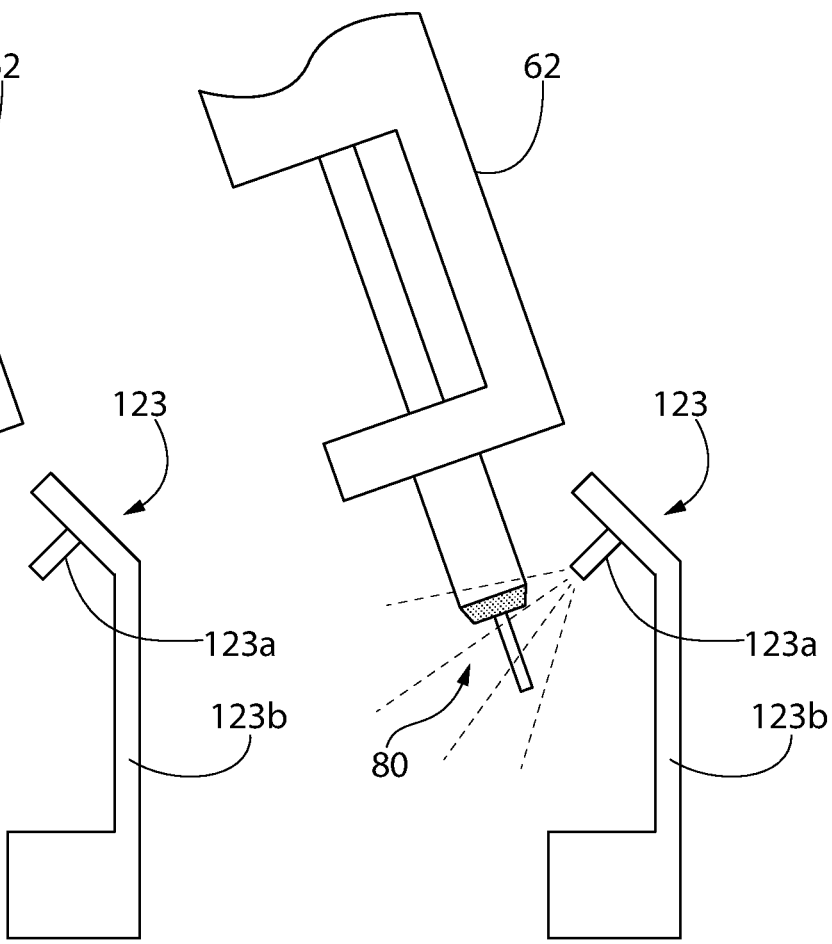

As shown in FIGS. 15-16, PRW 50 retracts the articulating arm assembly 60 inwards to position welding head 80 at each of the welding preparation stations in sequence. The weld head visits (in order) the welding wire cutter station 121 (FIG. 16), welding head reaming station 122 (FIG. 18), and an anti-spatter liquid misting station 123 (FIG. 20). The welding head 80 is now ready to start the second welding pass.

Figure 22:
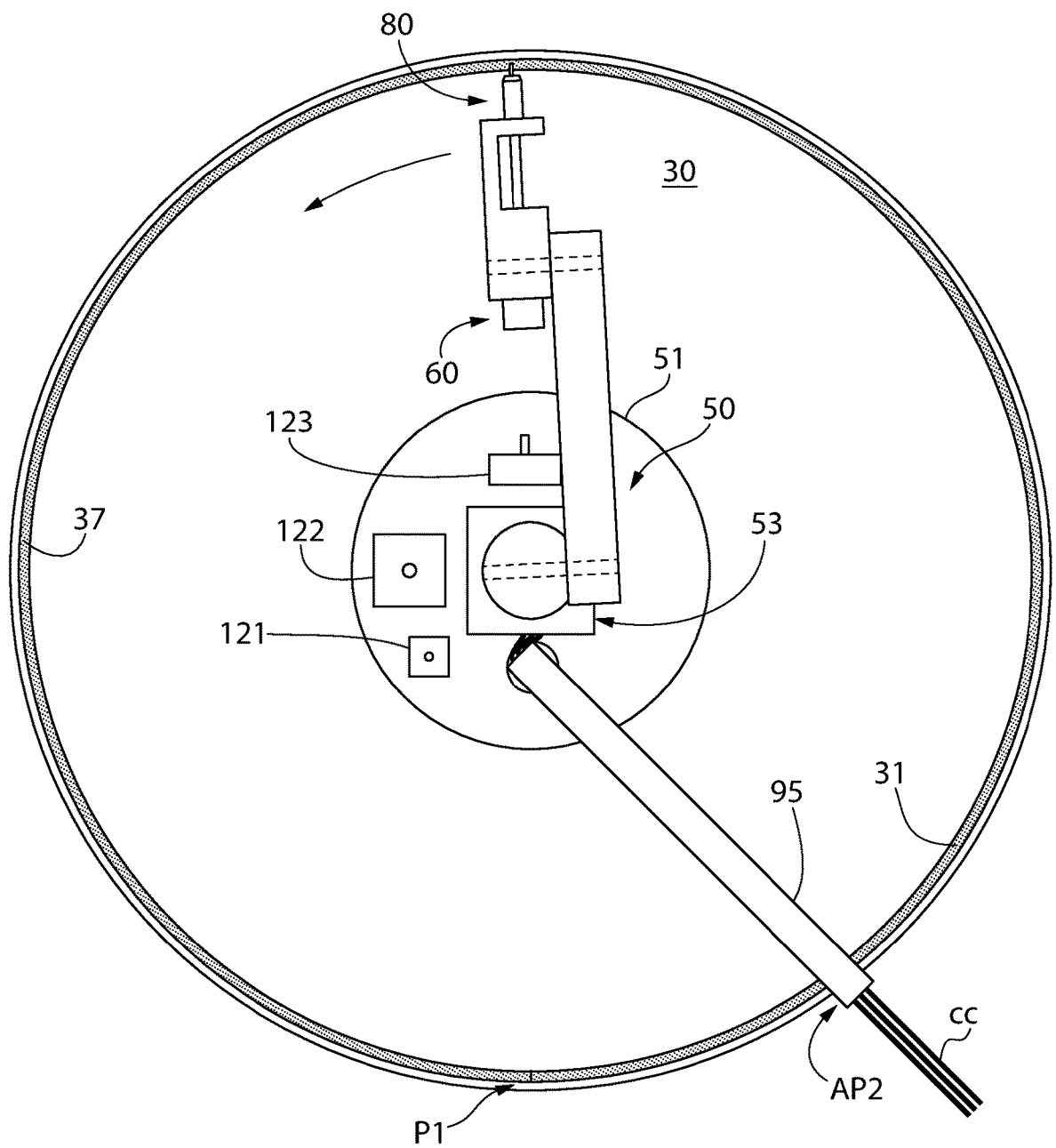
FIG. 22 is a seventh top view in a welding process sequence for making a lid-to-shell weld of the container.
Figure 23:
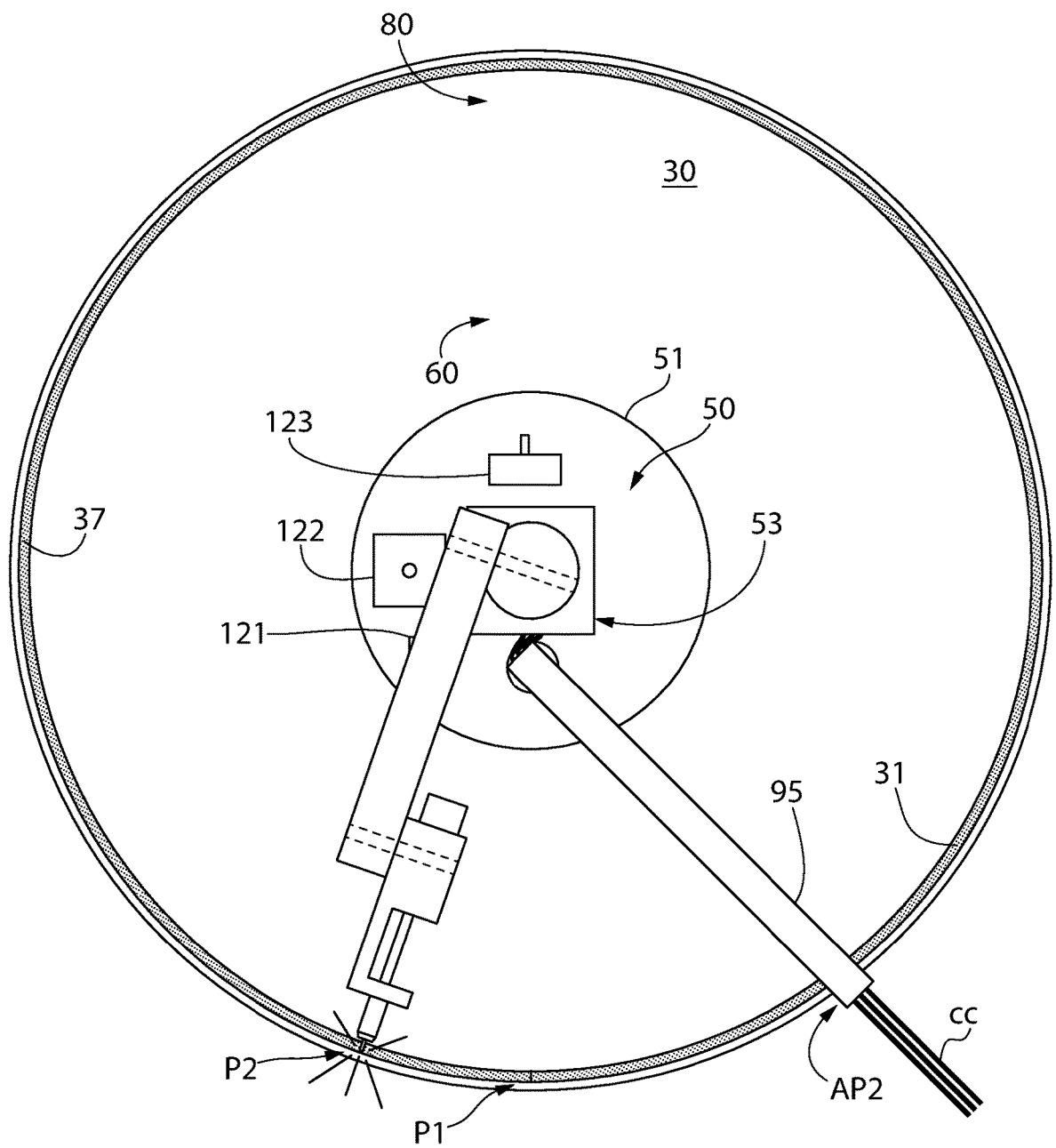
FIG. 23 is an eighth top view in a welding process sequence for making a lid-to-shell weld of the container.

Referring to FIG. 22, the robotic articulating arm assembly 60 is returned to its extended position and welding head 80 relocates the weld joint 37 via joint tracking sensor 83. The arm assembly rotates in the same first rotational direction (counter-clockwise in the figure) to a new second starting point P2 (FIG. 23). In one embodiment, P2 is preferably offset from the first starting point P1 to avoid igniting the weld arc at the same location for the second welding pass along the weld joint 37. In other embodiments, P2 may be the same as P1 if desired. In either case, it should be observed that that the cable-conduit management apparatus 95 remains in the second angular position AP2 at the start of the second weld pass for efficiency.

It bears noting that the second weld pass will be implemented completed in accordance with the welding plan previously developed and stored in memory of the main controller 100. If real-time mapping is used, the controller may readjust the welding plan as to compensate for the actual weld bead material previously laid in joint 37 during the first weld pass.

To commence welding in the second weld pass along the weld joint 37, main controller 100 instructs the PRW 50 to rotate the articulating arm assembly 60 and welding head 80 in a second rotational direction, which may be the same as the first rotational direction (counter-clockwise in FIG. 24) from the second starting point P1 around the entire weld joint 37 back to second starting point P2 thereby completing a full 360 degree second revolution of the articulating arm assembly. This completes the second welding pass around the weld joint. As the weld head 80 rotates, weld material from welding wire 81 is again simultaneously deposited and laid (i.e. second weld bead) in the circumferential weld joint 37 during the second revolution. The second weld bead may at least partially overlap the first weld bead in some instances, or not depending on where each weld bead is laid.

Figure 24:
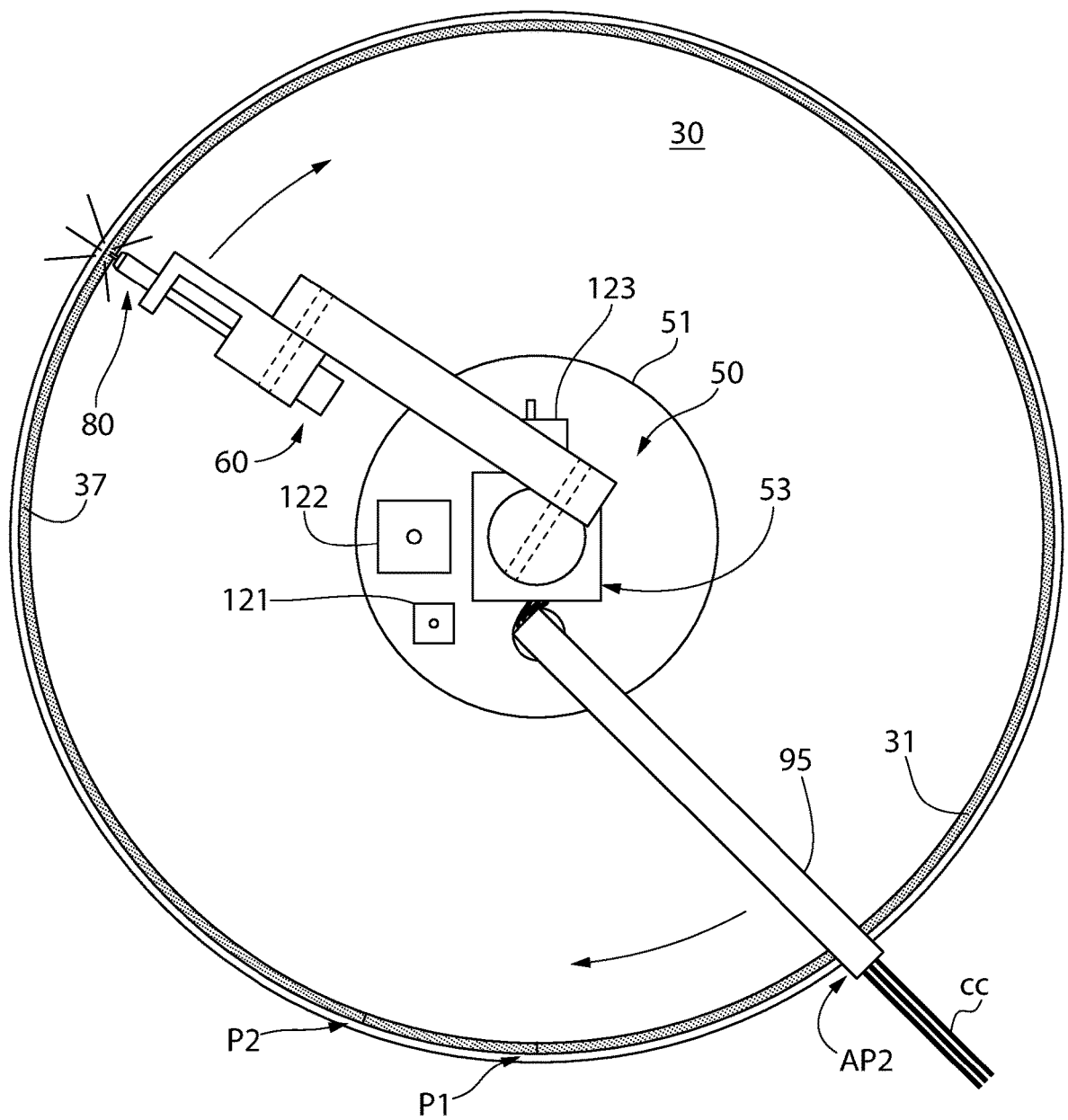
FIG. 24 is a ninth top view in a welding process sequence for making a lid-to-shell weld of the container.
Figure 25:
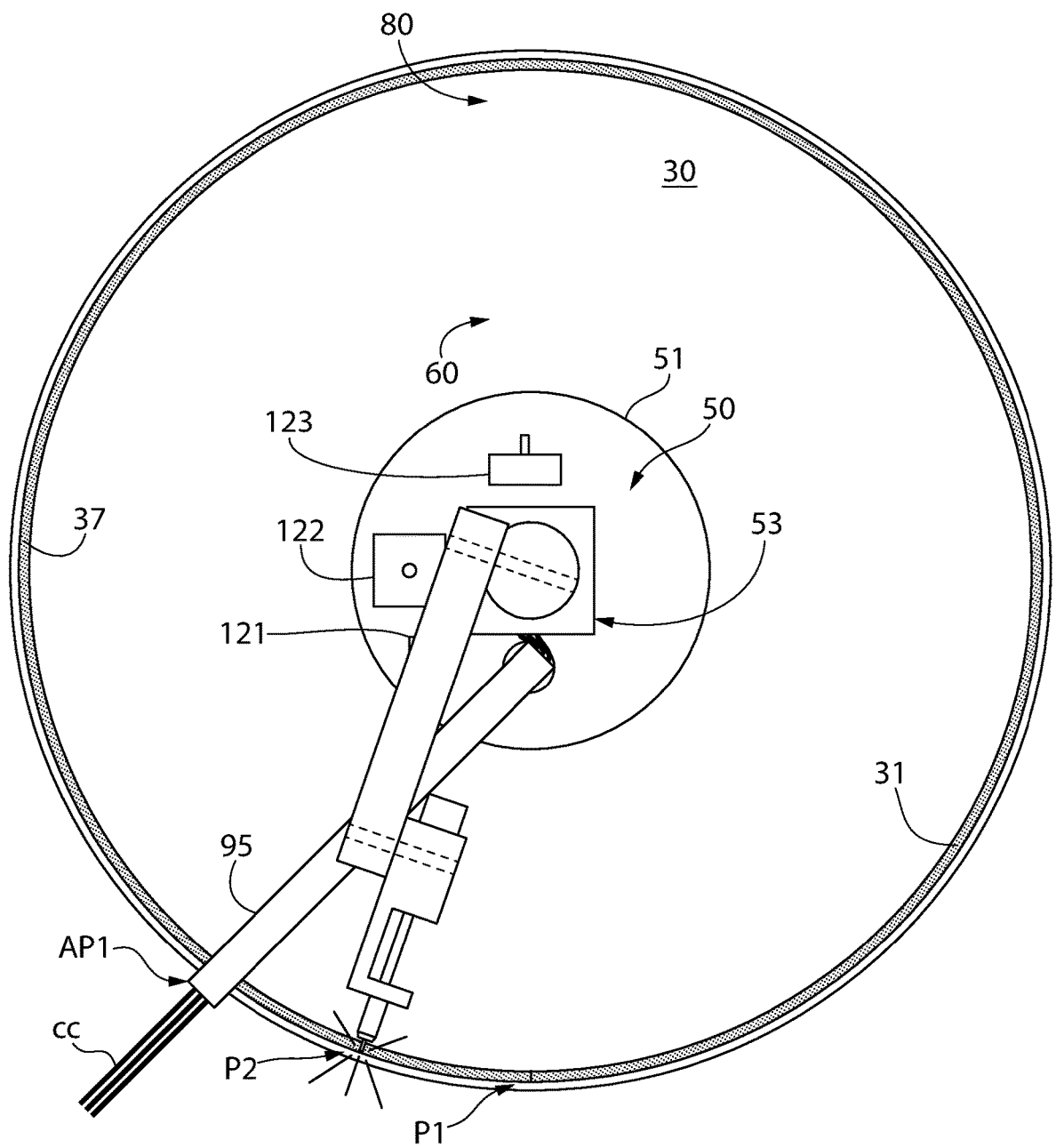
FIG. 25 is a tenth top view in a welding process sequence for making a lid-to-shell weld of the container.

As shown in FIGS. 24-25-15, during the foregoing second revolution of weld head 80 while the PRW 50 is welding, the controller automatically moves cable-conduit management apparatus 95 back to the firsts angular position AP1 to allow the welding head to rotate fully back to the second staring point P2 for completing the second contiguous weld bead from end to end.

The foregoing method/process is repeated multiple times to lay successive contiguous weld beads which progressively and fully fill the weld joint 37 with weld material, thereby forming the completed hermetic seal weld of the butt weld type. The joint may be overfilled in some implementations of the process forming a rounded weld crown which may be ground flush with the top surfaces of the canister shell 21 and lid 30 (see, e.g. FIG. 2A).

Once the canister lid-to-shell butt weld is completed, the PRW 50 may be unbolted from the lid 30, lifted, and transported to another canister 20 to complete the same process above. The PRW 50 is advantageously highly portable and easily maneuverable at the nuclear plant site.

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A robotic welding system for containment of radioactive nuclear waste comprising:
a container defining a cavity configured to hold the nuclear waste;

a lid disposed on the container and defining an open weld joint therebetween;

a programmable robotic welder positioned over the lid, the robotic welder programmable and operable to automatically form a weld in the weld joint;

wherein the robotic welder includes a rotatable articulating arm assembly and a welding head disposed at a distal end thereof operable to form the weld;

wherein the articulating arm assembly is rotatably mounted to a base positioned and detachably mounted on the lid; and wherein the base is configured and constructed to shield the robotic welder from radiation emitted by the nuclear waste in the container.

2. The system according to claim 1, wherein the welding head comprises a welding wire and a gas nozzle fluidly coupled to a shielding gas source, the gas nozzle operable to dispense the shielding gas when forming the weld.

3. The system according to claim 2, further comprising a cooling water system fluidly coupled to the welding head.

4. The system according to claim 3, further comprising an automatic welding wire feeder disposed on the articulating arm assembly, the feeder operable to continuously feed welding wire to welding head.

5. The system according to claim 1, wherein the articulating arm assembly of the robotic welder is centrally positioned and detachably mounted on the lid.

6. The system according to claim 5, wherein the articulating arm assembly is coupled to a rotary drive mechanism, the rotary drive mechanism operable to rotate the arm assembly in a 360 degree circumferential path around the lid.

7. The system according to claim 6, wherein the rotary drive mechanism is supported on the base which in turn is detachably mounted to the lid by bolting.

8. The system according to claim 1, wherein the weld joint is a circumferentially-extending lid-to-shell joint formed between a cylindrical shell of the container and an annular peripheral edge of the lid.

9. The system according to claim 8, wherein the lid has a smaller outside diameter than an inside diameter of the shell such that the lid is seated completely inside a top of the shell.

10. The system according to claim 9, wherein a top surface of the lid is flush with a top surface of a peripheral edge portion of the shell.

11. The system according to claim 8, wherein the weld joint is a circumferential butt joint.

12. The system according to claim 1, wherein the base comprises a boron-containing material.

13. The system according to claim 12, wherein the base has a composite construction comprising a top metal layer, a bottom metal layer, and an intermediate neutron absorbing layer formed of the boron-containing material.

14. The system according to claim 13, wherein the top and bottom metal layers are formed of the same or different materials selected from the group consisting of steel, copper, and lead.

15. The system according to claim 1, wherein the base is polygonal or non-polygonal in shape.

16. The system according to claim 1, further comprising a tubular cable-conduit management apparatus pivotably mounted at a base of the articulating arm assembly.

17. The system according to claim 16, wherein the cable-conduit management apparatus has a rigid body defining a channel extending from one end to another end configured for routing a plurality of cables and conduits therethrough to the articulating arm assembly.

18. The system according to claim 17, wherein the cable-conduit management apparatus is pivotably movable in a total arcuate path of at least about 20 degrees but less than 360 degrees.

19. The system according to claim 1, further comprising a programmable main controller operably coupled to the robotic welder, the main controller programmable to direct operation of the robotic welder.

20. The system according to claim 19, wherein the main controller is configured to:

extend the articulating arm assembly from a radially inward retracted position to a radially outward extended position;

position the welding head proximate to the weld joint; and direct the robotic welder to form the weld in accordance with a preprogrammed welding sequence and path.

21. The system according to claim 20, wherein the weld joint is circumferential and the main controller is preprogrammed to follow a circumferential welding path to form the weld in the weld joint.

22. The system according to claim 20, wherein the weld joint is a circumferentially-extending lid-to-shell joint formed between a cylindrical shell of the container and an annular peripheral edge of the lid.

23. The system according to claim 20, further comprising a joint tracking sensor mounted proximate to the welding head and communicably coupled to the main controller, the joint tracking sensor operable to locate and map geometric parameters of the entire weld joint which are transmitted to the main controller to develop the preprogrammed welding sequence and path.

24. The system according to claim 23, the main controller comprises adaptive control logic which via the joint tracking sensor allows the main controller to monitor the dimensions of the weld joint in real-time as it is formed and control the robotic welder to uniformly fill the weld joint with the weld regardless of the weld joint geometry.

25. The system according to claim 23, further comprising a camera mounted proximate to the welding head and communicably linked to the main controller, the main controller operable to display real-time images of the weld formation on a display monitor.

26. The system according to claim 20, further comprising an air cooling system operable to supply and direct cooling air towards the optical sensor.

27. The system according to claim 26, wherein the air cooling system includes a cooling air module mounted to the articulating arm assembly, the cooling air module including a pressure regulator operable to reduce pressure from an air supply source to a preselected air pressure setpoint.

28. The system according to claim 20, further comprising a temperature sensor located proximate to the welding head and communicably coupled to the main controller, the temperature sensor operable to transmit real-time temperatures of the welding head back to the main controller.

29. A robotic welding system for containment of radioactive nuclear waste comprising:

a container defining a cavity configured to hold the nuclear waste;

a lid disposed on the container and defining an open weld joint therebetween;

a programmable robotic welder positioned over the lid, the robotic welder programmable and operable to automatically form a weld in the weld joint;

wherein the robotic welder includes a rotatable articulating arm assembly and a welding head disposed at a distal end thereof operable to form the weld;

wherein the articulating arm assembly of the robotic welder is centrally positioned and detachably mounted on the lid;

wherein the articulating arm assembly is coupled to a rotary drive mechanism, the rotary drive mechanism operable to rotate the arm assembly in a 360 degree circumferential path around the lid; and wherein the rotary drive mechanism is supported on a radiation shielded base in turn detachably mounted to the lid by bolting.

* * * * *